(12) United States Patent
Takagi

(10) Patent No.: US 9,036,518 B2
(45) Date of Patent: May 19, 2015

(54) WIRELESS BASE STATION APPARATUS, WIRELESS COMMUNICATION SYSTEM, WIRELESS COMMUNICATION METHOD, AND PROGRAM

(75) Inventor: Kenki Takagi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 559 days.

(21) Appl. No.: 13/256,668

(22) PCT Filed: Mar. 17, 2010

(86) PCT No.: PCT/JP2010/054524
§ 371 (c)(1),
(2), (4) Date: Sep. 15, 2011

(87) PCT Pub. No.: WO2010/107055
PCT Pub. Date: Sep. 23, 2010

(65) Prior Publication Data
US 2012/0002632 A1    Jan. 5, 2012

(30) Foreign Application Priority Data
Mar. 17, 2009  (JP) .................. 2009-064792

(51) Int. Cl.
*H04B 7/00*  (2006.01)
*H04W 72/04*  (2009.01)
(Continued)

(52) U.S. Cl.
CPC .......... *H04W 72/0426* (2013.01); *H04W 16/32* (2013.01); *H04W 72/082* (2013.01); *H04W 72/087* (2013.01); *H04W 84/045* (2013.01)

(58) Field of Classification Search
CPC ............. H04W 28/0231–28/0242; H04W 28/16–28/24; H04W 36/24–36/30; H04W 72/08–72/087; H04W 72/12–72/1236
USPC ................................. 370/310–350
See application file for complete search history.

(56) References Cited

U.S. PATENT DOCUMENTS

2004/0185853 A1 * 9/2004 Kim et al. .............. 455/438
2007/0197178 A1    8/2007 Gu
(Continued)

FOREIGN PATENT DOCUMENTS

CN    1281326 A    1/2001
CN    1430431 A    7/2003
(Continued)

OTHER PUBLICATIONS

Japanese Office Action for JP2011-504860 mailed on Sep. 18, 2012.
(Continued)

*Primary Examiner* — Andrew Chriss
*Assistant Examiner* — Kenan Cehic
(74) *Attorney, Agent, or Firm* — Sughrue Mion, PLLC

(57) ABSTRACT

A wireless communication system comprises: first wireless base station apparatus that covers first cell; and second wireless base station apparatus that covers second cell that is wider than first cell and overlaps at least a portion of first cell, wherein: in a case of performing communication with mobile station terminal included in first cell, first wireless base station apparatus makes reference to communication quality of the second cell, judges whether or not wireless resource(s) of second wireless base station apparatus is to be reserved, and, when a judgment is made that reservation of wireless resource(s) is necessary, transmits wireless resource allocation request including necessary resource amount to second wireless base station apparatus; and in a case of receiving wireless resource allocation request from first wireless base station apparatus, second wireless base station apparatus allocates wireless resource(s) in accordance with necessary resource amount to first wireless base station apparatus.

19 Claims, 19 Drawing Sheets

(51) Int. Cl.
    *H04W 16/32*    (2009.01)
    *H04W 72/08*    (2009.01)
    *H04W 84/04*    (2009.01)

(56) References Cited

U.S. PATENT DOCUMENTS

| | | | |
|---|---|---|---|
| 2007/0211656 A1* | 9/2007 | Kwak et al. | 370/319 |
| 2008/0130573 A1* | 6/2008 | Lee et al. | 370/331 |
| 2008/0225752 A1* | 9/2008 | Kwon et al. | 370/254 |
| 2010/0151864 A1 | 6/2010 | Mori | |
| 2010/0157826 A1* | 6/2010 | Yu et al. | 370/252 |
| 2010/0177672 A1* | 7/2010 | Dayal et al. | 370/311 |
| 2010/0318670 A1* | 12/2010 | Al-Shalash et al. | 709/229 |

FOREIGN PATENT DOCUMENTS

| | | |
|---|---|---|
| JP | 2003250178 A | 9/2003 |
| JP | 2008278263 A | 11/2008 |
| JP | 2008278264 A | 11/2008 |
| JP | 2009010509 A | 1/2009 |
| WO | 2008/056426 A1 | 5/2008 |

OTHER PUBLICATIONS

Research In Motion, Limited, L2 Relay Interference Mitigation [online], 3GPP TSG-RAN WG1#56 R1-090575, Internet<URL:http://www.3gpp.org/ftp/tsg_ran/WG1_RL1/TSGR1_56/Docs/R1-090575.zip>, Feb. 9, 2009, pp. 1-6.
International Search Report for PCT/JP2010/054524 mailed Jun. 22, 2010.
Dai Bu <Sene Koo no Scenario> Itsunomanika '4G' e Shoka 1G Bit/Byo Goe o Mezasu, Nikkei Electronics, Sep. 8, 2008, No. 986, pp. 61-67.
K. Aso, "Question 5 lma no Kichikyoku to Konshin Shinaino?", Nikkei Network, Oct. 22, 2007, No. 91, pp. 72-73.
NTT Docomo "Downlink Interference Coordination BEtween eNodeB and Home eNodeB", 3GPP, TSG RAN WG1 Meeting #60, R1-101225, Feb. 2010, pp. 1-8.
Chinese Office Action for CN Application No. 201080012460.6 issued on Oct. 14, 2013 with English Translation.

* cited by examiner

FIG. 10

| 1 | DESTINATION eNB IDENTIFICATION ID 2001 |
|---|---|
| 2 | SOURCE HeNB IDENTIFICATION ID 2002 |
| 3 | NECESSARY RESOURCE AMOUNT 2003 |
| 4 | NEIGHBORING HeNB CELL IDENTIFICATION ID LIST 2004<br><br>NEIGHBORING HeNB IDENTIFICATION ID #1<br>.<br>.<br>.<br>NEIGHBORING HeNB IDENTIFICATION ID #n |

| 1 | DESTINATION HeNB IDENTIFICATION ID 3001 |
|---|---|
| 2 | SOURCE eNB IDENTIFICATION ID 3002 |
| 3 | GIVEN RESOURCE AMOUNT 3003<br><br>SUB-FRAME NUMBER<br>OR<br>SLOT NUMBER<br>OR<br>RESOURCE BLOCK NUMBER |

701

WIRELESS BASE STATION APPARATUS, WIRELESS COMMUNICATION SYSTEM, WIRELESS COMMUNICATION METHOD, AND PROGRAM

REFERENCE TO RELATED APPLICATION

This application claims the benefit of Japanese Patent Application No. 2009-064792, filed on Mar. 17, 2009, the disclosure of which is incorporated herein in its entirety by reference thereto. The present invention relates to a wireless base station apparatus, a wireless (radio) communication system, a wireless communication method, and a program, and in particular relates to a small wireless base station apparatus and macro wireless base station apparatus, a wireless communication system provided with these, and a wireless communication method and program therefor.

TECHNICAL FIELD

Background

A home wireless base station apparatus (Home eNode B, HeNB) is a wireless base station apparatus that can be used only by limited users, such as in a home or a small scale office (SOHO, café, or the like). With regard to home wireless base station apparatuses, a wireless base station apparatus of an LTE (Long Term Evolution) system has been deployed to the home, based on an LTE method. By usage of the home wireless base station apparatus among limited users only, wireless resources can be exclusively held by a small number of people. Therefore, according to the home wireless base station apparatus, a user can experience high speed data communication in comparison with mobile wireless communication in a conventional general network.

Home wireless base station apparatuses are also set up in individual homes in areas already covered by a macro wireless base station apparatus that covers a wide area. Therefore, an area covered by the macro wireless base station apparatus and an area covered by a home wireless base station apparatus may overlap.

In a case of setting up a home wireless base station apparatus, it is necessary to avoid interference between a home wireless base station apparatus and a macro wireless base station apparatus that covers an area with a radius of several 100 m to tens of km, in addition to avoiding interference between neighboring home wireless base station apparatuses. In actuality, the following type of interference may occur.

First, a down channel, in which a macro wireless base station apparatus (or a neighboring home wireless base station apparatus) transmits, constitutes interference to a mobile station terminal connected to a home wireless base station apparatus. Second, a down channel, in which a home wireless base station apparatus transmits, constitutes interference to a mobile station terminal connected to a macro wireless base station apparatus (or a neighboring home wireless base station apparatus). Third, an up channel, in which a mobile station terminal connected to a home wireless base station apparatus transmits, constitutes interference to a macro wireless base station apparatus (or a neighboring home wireless base station apparatus). Fourth, an up channel, in which a mobile station terminal connected to a macro wireless base station apparatus (or a neighboring home wireless base station apparatus) transmits, constitutes interference to a home wireless base station apparatus.

With regard to the problem in question, in a home wireless base station apparatus of a WCDMA (Wideband Code Division Multiple Access) system, consideration is given to avoiding the problem by using the following methods.

A first method is a method of utilizing a frequency that is used by a home wireless base station apparatus, different from a frequency used by a macro wireless base station apparatus, or of selecting a frequency with as low an interference level as possible. A frequency with a low interference level is referred to as a frequency of weak signal strength, when a down channel for a home wireless base station apparatus is monitored. This method is realized by monitoring neighboring cells by the home wireless base station apparatus and selecting an appropriate frequency.

A second method is a method of selecting a scrambling code that is different from a scrambling code used by a macro wireless base station apparatus, as a scrambling code used by the home wireless base station apparatus. This method is similarly realized by monitoring neighboring cells by the home wireless base station apparatus and selecting an appropriate scrambling code.

It is to be noted that Patent Document 1 describes a mobile communication system in which securing of a number of user connections and high communication quality are simply realized.

[Patent Document 1]
Japanese Patent Kokai Publication No. JP2003-250178A

SUMMARY

The entire disclosure of the abovementioned Patent Document 1 is incorporated herein by reference thereto. The following analysis is given by the present inventor.

A WCDMA system is a system in which frequency is divided into fixed frequency bands (5 MHz) and used as separate frequency bands, as in frequency #1, frequency #2. On the other hand, an LTE system is a system that realizes a maximum data rate (a little over 100 Mbps) by grouping and using all frequency bands (maximum 20 MHz) that can be used. Therefore, in the LTE system, a frequency band used by a macro wireless base station apparatus and a home wireless base station apparatus cannot be easily divided, as in the WCDMA system.

Furthermore, with regard to WCDMA, since a CDMA (Code Division Multiple Access) system is used, even in a case of using the same frequency band, it is possible to increase resistance to interference by dividing scrambling codes. On the other hand, in the LTE system, since an OFDMA (Orthogonal Frequency Division Multiple Access) system is adopted, an interference resistance improvement strategy such as dividing scrambling codes, as in WCDMA, does not exist.

Therefore, according to the LTE system, in a case where frequency bands used between a macro wireless base station apparatus and a home wireless base station apparatus overlap, there is a risk that downward directed (downlink) radio waves of respective apparatuses and upward directed (uplink) radio waves from mobile station terminals connected to the respective apparatuses will interfere with each other, and the communication quality will deteriorate.

In order to solve the problems in question, consideration may be given to fixed division and allocation of a frequency band used by the macro wireless base station apparatus and the home wireless base station apparatus as described above.

However, in a case, for example, where a limited frequency band to be allocated to respective operators is allocated in a fixed manner as in 5 MHz to the home wireless base station apparatus and 15 MHz to the macro wireless base station apparatus, the macro wireless base station apparatus cannot provide a maximum data rate (a little over 100 Mbps) using 20 MHz. This may be a constraint that is not acceptable to an operator who expects a data rate of 100 Mbps or above. Furthermore, according to a method of simply dividing a frequency band, it is difficult to handle a case where several dozen to several 100 home wireless base station apparatuses are present under one macro wireless base station apparatus.

Therefore, there is a need in the art to provide a wireless base station apparatus, a wireless communication system, a wireless communication method, and a program that avoid interference between a first wireless base station apparatus (for example, a home wireless base station apparatus) that covers a first cell, and a second wireless base station apparatus (for example, a macro wireless base station apparatus) that covers a second cell that is wider than the first cell and overlaps at least a portion of the first cell, and in addition, to curtail reduction of available frequency carriers in the second wireless base station apparatus.

According to a first aspect of the present invention, there is provided a wireless (radio) communication system, comprising: a first wireless base station apparatus that covers a first cell; and a second wireless base station apparatus that covers a second cell that is wider than the first cell and overlaps at least a portion of the first cell, wherein: in a case of performing communication with a mobile station terminal included in the first cell, the first wireless base station apparatus makes reference to communication quality of the second cell, judges whether or not a wireless resource of the second wireless base station apparatus is to be reserved, and, when a judgment is made that reservation of the wireless resource is necessary, transmits a wireless resource allocation request including a necessary resource amount to the second wireless base station apparatus; and in a case of receiving the wireless resource allocation request from the first wireless base station apparatus, the second wireless base station apparatus allocates a wireless resource in accordance with the necessary resource amount to the first wireless base station apparatus.

According to a second aspect of the present invention, there is provided a first wireless (radio) base station apparatus that covers a first cell, wherein: in a case of performing communication with a mobile station terminal included in the first cell, the first wireless base station apparatus makes reference to communication quality of a second cell that is wider than the first cell and overlaps at least a portion of the first cell, judges whether or not a wireless resource of a second wireless base station apparatus that covers the second cell is to be reserved, and, when a judgment is made that reservation of the wireless resource is necessary, transmits a wireless resource allocation request including a necessary resource amount to the second wireless base station apparatus.

According to a third aspect of the present invention, there is provided a second wireless (radio) base station apparatus that covers a second cell that is wider than a first cell covered by a first wireless base station apparatus and overlaps at least a portion of the first cell, wherein: in a case of receiving from the first wireless base station apparatus a wireless resource allocation request including a necessary resource amount with regard to the first wireless base station apparatus, the second wireless base station apparatus allocates a wireless resource in accordance with the necessary resource amount to the first wireless base station apparatus.

According to a fourth aspect of the present invention, there is provided a wireless (radio) communication method, comprising: in a case of performing communication with a mobile station terminal included in a first cell, by a first wireless base station apparatus that covers the first cell, making reference to communication quality of a second cell that is wider than the first cell and overlaps at least a portion of the first cell, and judging whether or not a wireless resource of a second wireless base station apparatus that covers the second cell is to be reserved; in a case of judging that reservation of the wireless resource is necessary, by the first wireless base station apparatus, transmitting a wireless resource allocation request including a necessary resource amount to the second wireless base station apparatus; and in a case of receiving the wireless resource allocation request from the first wireless base station apparatus, by the second wireless base station apparatus, allocating a wireless resource in accordance with the necessary resource amount to the first wireless base station apparatus.

According to a fifth aspect of the present invention, there is provided a wireless (radio) communication method, comprising: in a case of performing communication with a mobile station terminal included in a first cell, by a first wireless base station apparatus that covers the first cell, making reference to communication quality of a second cell that is wider than the first cell and overlaps at least a portion of the first cell, and judging whether or not a wireless resource of a second wireless base station apparatus that covers the second cell is to be reserved; and in a case of judging that reservation of the wireless resource is necessary, by the first wireless base station apparatus, transmitting a wireless resource allocation request including a necessary resource amount to the second wireless base station apparatus.

According to a sixth aspect of the present invention, there is provided a wireless (radio) communication method, comprising: by a second wireless base station apparatus that covers a second cell that is wider than a first cell covered by a first wireless base station apparatus and overlaps at least a portion of the first cell, receiving from the first wireless base station apparatus a wireless resource allocation request including a resource amount that is necessary with regard to the first wireless base station apparatus; and by the second wireless base station apparatus, allocating a wireless resource in accordance with the necessary resource amount to the first wireless base station apparatus.

According to a seventh aspect of the present invention, there is provided a program causing a CPU of a first wireless (radio) base station apparatus to execute: when communication is performed with a mobile station terminal included in a first cell covered by the first wireless base station apparatus, making reference to communication quality of a second cell that is wider than the first cell and overlaps at least a portion of the first cell, and judging whether or not a wireless resource of a second wireless base station apparatus that covers the second cell is to be reserved; and in a case of judging that reservation of the wireless resource is necessary, transmitting a wireless resource allocation request including a necessary resource amount to the second wireless base station apparatus.

According to a eighth aspect of the present invention, there is provided a program causing a CPU of a second wireless (radio) base station apparatus that covers a second cell that is wider than a first cell and overlaps at least a portion of the first cell to execute: receiving from a first wireless base station apparatus that covers the first cell a wireless resource allocation request including a resource amount that is necessary with regard to the first wireless base station apparatus; and allocating a wireless resource in accordance with the necessary resource amount to the first wireless base station apparatus. The program described above may be recorded on a non-transient computer-readable recording medium and provided as a program product.

The present invention provides the following advantage, but not restricted thereto. According to the wireless (radio) base station apparatus, the wireless communication system, the wireless communication method, and the program of the present invention, it is possible to avoid interference between a first wireless base station apparatus (for example, a home wireless base station apparatus) that covers a first cell, and a second wireless base station apparatus (for example, a macro wireless base station apparatus) that covers a second cell that is wider than the first cell and overlaps at least a portion of the first cell, and in addition to suppress reduction of available frequency carriers in the second wireless base station apparatus.

BRIEF DESCRIPTION OF THE DRAWINGS

FIG. 10 is a diagram showing a configuration of a resource allocation request in the second exemplary embodiment;

FIG. 14 is a diagram showing a configuration of a resource allocation response according to the second exemplary embodiment;

PREFERRED MODES

Figure 1:
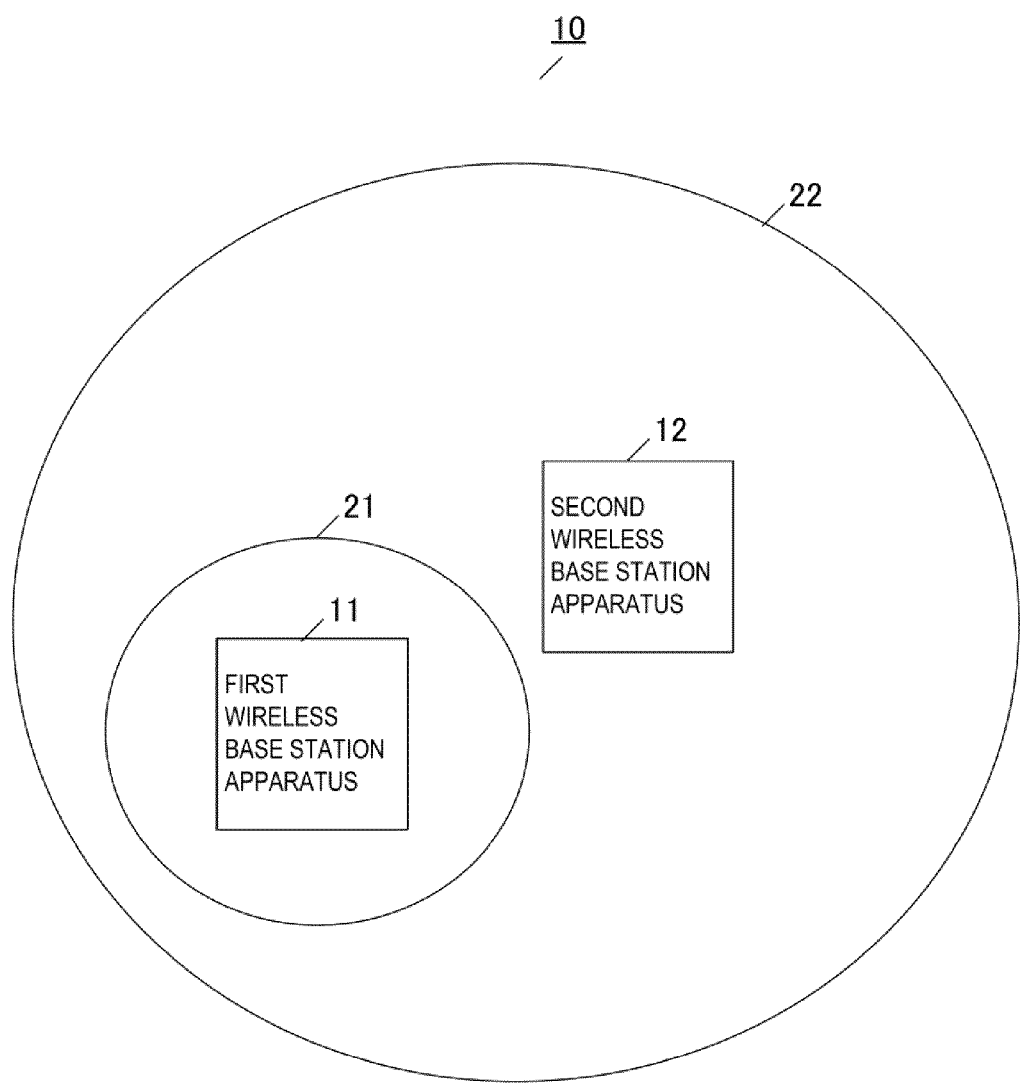
FIG. 1 is a diagram showing a configuration of a wireless communication system according to a first exemplary embodiment.

In the present disclosure, there are various possible modes, which include the following, but not restricted thereto. A wireless communication system of a first mode may be a wireless communication system according to the above described first aspect of the present invention.

In a wireless communication system of a second mode, the communication quality may relate to signal strength and path loss in a downlink reference channel of the second cell.

In a wireless communication system of a third mode, in a case where the signal strength is not less than a prescribed threshold, the first wireless base station apparatus may reserve a wireless resource of a downlink of the second wireless base station apparatus.

In a wireless communication system of a fourth mode, in a case where path loss is not less than a prescribed threshold, the first wireless base station apparatus may reserve an uplink wireless resource of the second wireless base station apparatus.

In a wireless communication system of a fifth mode, the necessary resource amount may be a resource amount that satisfies a maximum data rate in an upward and a downward direction supported by the first wireless base station apparatus.

In a wireless communication system of a sixth mode, the necessary resource amount may be a resource amount according to type or kind of service requested by the mobile station terminal.

In a wireless communication system of a seventh mode, the necessary resource amount may be a resource amount according to type or kind of service requested by a higher-level (superordinate) control apparatus of the first wireless base station apparatus and the second wireless base station apparatus.

In a wireless communication system of an eighth mode, in a case of receiving a wireless resource allocation request from the first wireless base station apparatus, the second wireless base station apparatus may allocate maximum allocatable wireless resources, not greater than a necessary resource amount, to the first wireless base station apparatus.

In a wireless communication system of a ninth mode, in a case of receiving the wireless resource allocation request from the first wireless base station apparatus, when a third cell, covered by a third wireless base station to which a wireless resource is already allocated by the second wireless base station apparatus, and the first cell do not overlap, the second wireless base station apparatus may allocate to the first wireless base station apparatus a wireless resource at least partially overlapping the wireless resource allocated to the third wireless base station.

In a wireless communication system of a tenth mode, each time the wireless resource allocation request is received from the first wireless base station apparatus, the second wireless base station apparatus may sequentially allocate a wireless resource of a prescribed resource amount.

In a wireless communication system of an eleventh mode, the second wireless base station apparatus may allocate a wireless resource with a resource block as a unit.

In a wireless communication system of a twelfth mode, the second wireless base station apparatus may allocate a wireless resource with a sub-frame as a unit.

In a wireless communication system of a thirteenth mode, the first wireless base station apparatus and the third wireless base station apparatus may be a home wireless base station apparatus.

In a wireless communication system of a fourteenth mode, the second wireless base station apparatus may be a macro wireless base station apparatus.

A wireless base station apparatus of a fifteenth mode may be a wireless base station apparatus according to the above described second aspect of the present invention.

A wireless base station apparatus of a sixteenth mode may a wireless base station apparatus according to the above described third aspect of the present invention.

A wireless communication method of a seventeenth mode may be a wireless communication method according to the above described fourth aspect of the present invention.

A wireless communication method of an eighteenth mode may be a wireless communication method according to the above described fifth aspect of the present invention.

A wireless communication method of a nineteenth mode may be a wireless communication method according to the above described sixth aspect of the present invention.

A program of a twentieth mode may be a program according to the above described seventh aspect of the present invention.

A program of a twenty-first mode may be a program according to the above described eighth aspect of the present invention. It is to be noted that according to the present invention, there is provided a computer readable recording medium in which the abovementioned program is recorded.

First Exemplary Embodiment

A description is given concerning a wireless communication system according to a first exemplary embodiment, making reference to the drawings. FIG. 1 is a diagram showing a configuration of the wireless communication system according to the present exemplary embodiment. Referring to FIG. 1, a wireless communication system 10 is provided with a first wireless base station apparatus 11 and a second wireless base station apparatus 12.

The first wireless base station apparatus 11 covers a first cell 21. Meanwhile, the second wireless base station apparatus 12 covers a second cell 22 that is wider than the first cell 21 and that overlaps at least a portion of the first cell 21.

In a case of performing communication with a mobile station terminal included in the first cell 21, the first wireless base station apparatus 11 judges whether or not a wireless resource of the second wireless base station apparatus 12 should be reserved, by making reference to communication quality of the second cell 22. When a judgment is made that reservation of the wireless resource is necessary, the first wireless base station apparatus 11 transmits a wireless resource allocation request including a necessary resource amount to the second wireless base station apparatus 12.

In a case of receiving the wireless resource allocation request from the first wireless base station apparatus 11, the second wireless base station apparatus 12 allocates a wireless resource in accordance with the necessary resource amount to the first wireless base station apparatus 11.

Second Exemplary Embodiment

A description is given concerning a wireless communication system according to a second exemplary embodiment, making reference to the drawings.

Configuration

Figure 2:
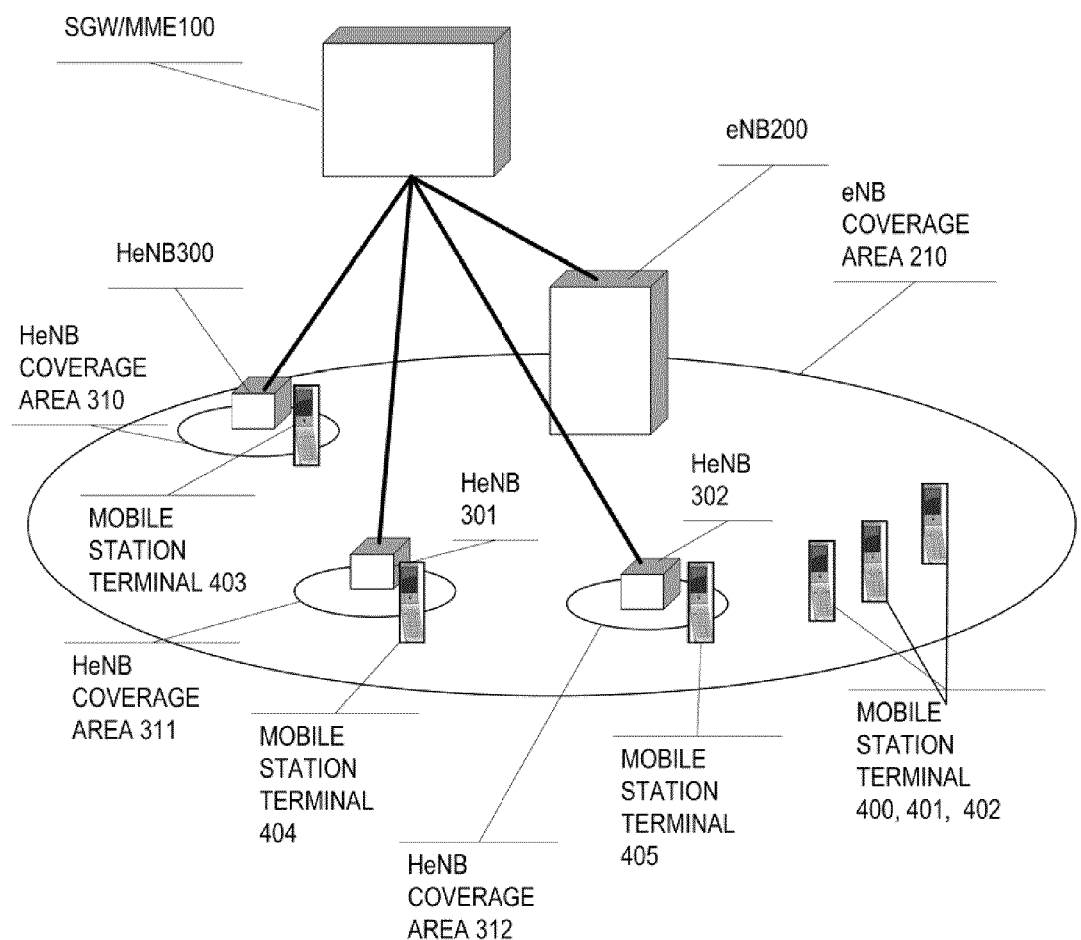
FIG. 2 is a diagram showing a configuration of a wireless communication system according to a second exemplary embodiment.

FIG. 2 is a diagram showing a configuration of the wireless communication system according to the present exemplary embodiment. Referring to FIG. 2, the wireless communication system is provided with a macro wireless base station apparatus (eNB) 200, home wireless base station apparatuses (HeNBs) 300 to 302, and a gateway/handover control apparatus (SGW/MME) 100.

The macro wireless base station apparatus (eNB) 200 covers a comparatively wide area of several 100 meters to several kilometers. The home wireless base station apparatuses (HeNBs) 300 to 302 cover a small area such as within a home, of several meters to several dozen meters. The SGW/MME 100 is a higher-level apparatus of the eNB 200 and the HeNBs 300 to 302, and performs data forwarding within an LTE system and to other communication systems.

The eNB 200 has a coverage area 210. The HeNBs 300 to 302 respectively have coverage areas 310 to 312. The coverage areas 210 and 310 to 312 respectively include mobile station terminals 400 to 405, from a few to several 100 in number.

Figure 3:
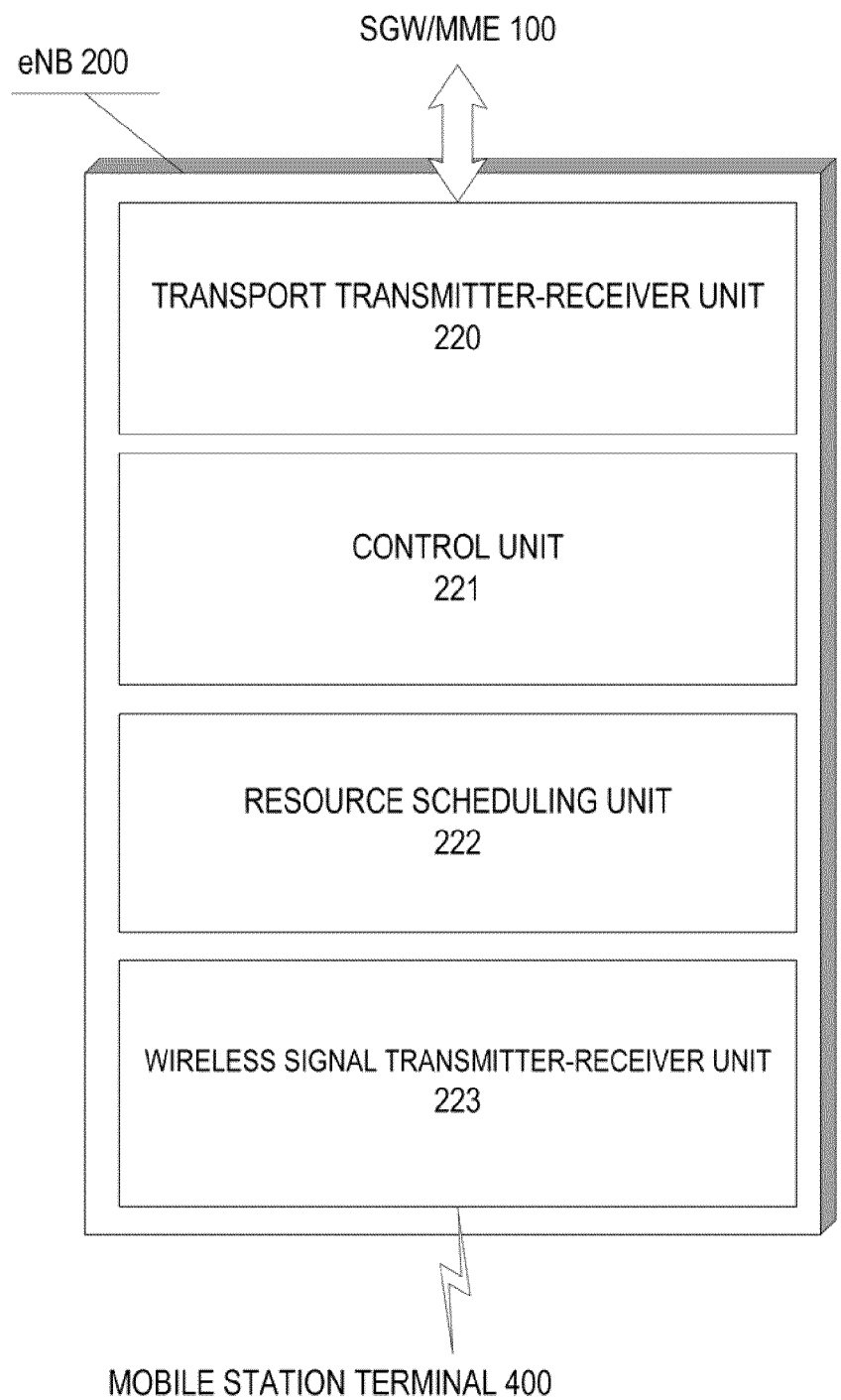
FIG. 3 is a block diagram showing a configuration of a macro wireless base station apparatus according to the second exemplary embodiment.

FIG. 3 is a block diagram showing a configuration of the eNB 200 according to the present exemplary embodiment. The eNB 200 is provided with a transport transmitter-receiver unit 220, a control unit 221, a resource scheduling unit 222, and a wireless signal transmitter-receiver unit 223.

The eNB 200 performs communication via wire, with the SGW/MME 100, which is a higher-level apparatus. The transport transmitter-receiver unit 220 controls transmission and reception of data by wire.

The eNB 200 performs wireless communication with the mobile station terminal 400. The wireless signal transmitter-receiver unit 223 performs control of wireless data transmission and reception.

The resource scheduling unit 222 performs scheduling (resource scheduling) so that wireless resources used in wireless signal transmission and reception with the mobile station terminal 400 do not overlap between mobile station terminals.

The control unit 221 controls respective functional blocks thereof.

Figure 4:
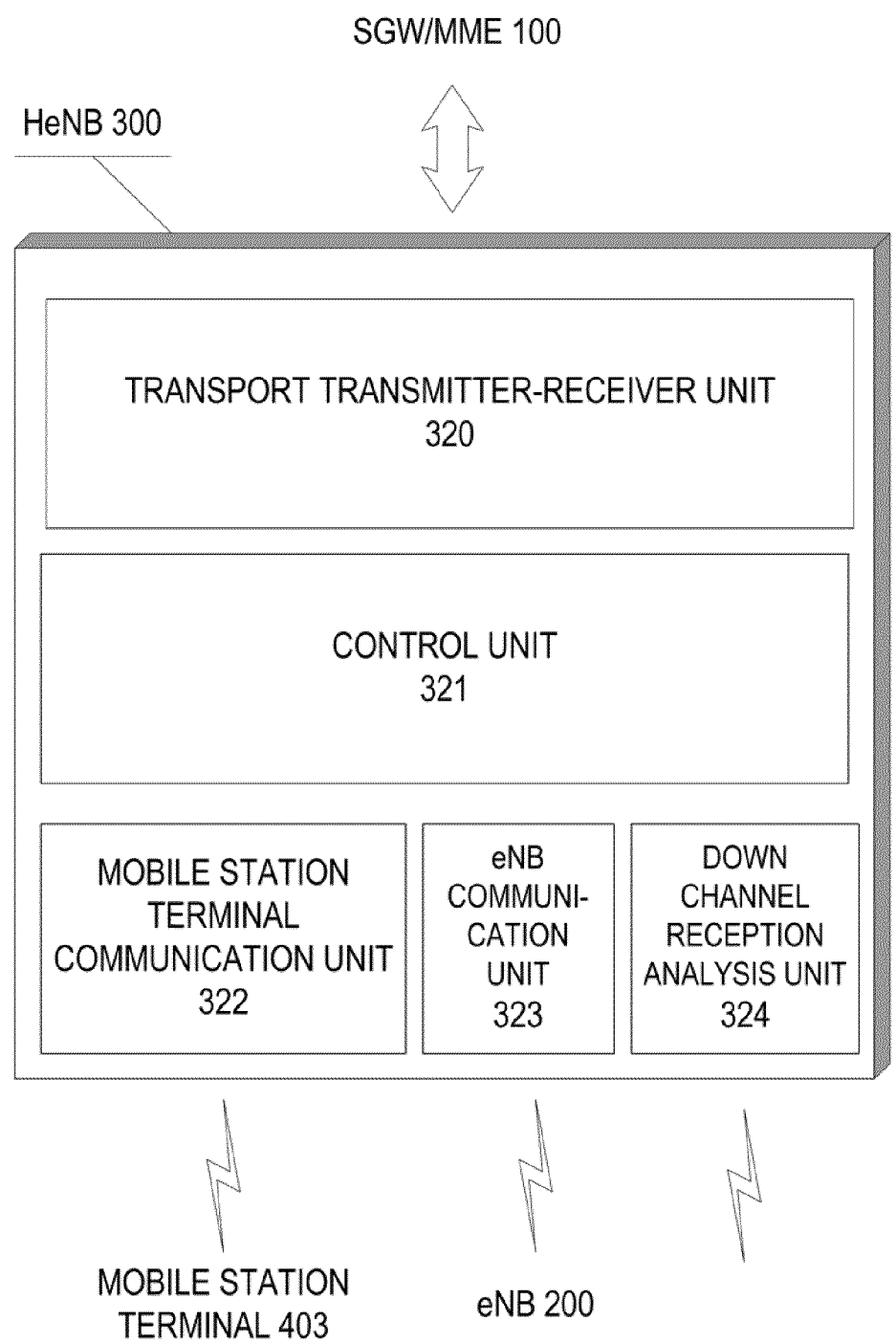
FIG. 4 is a block diagram showing another configuration of a home wireless base station apparatus according to the second exemplary embodiment.

FIG. 4 is a block diagram showing a configuration of the HeNB 300 according to the present exemplary embodiment. Configurations of the HeNBs 301 and 302 are the same as the configuration of the HeNB 300.

FIG. 4 shows a configuration of the HeNB 300 in a case of performing a wireless message exchange with the eNB 200. In this case, the HeNB 300 is provided with a transport transmitter-receiver unit 320, a control unit 321, a mobile station terminal communication unit 322, an eNB communication unit 323, and a down channel reception analysis unit 324.

The transport transmitter-receiver unit 320 performs transmission and reception of data by wire. The mobile station terminal communication unit 322 performs transmission and reception of signals with a mobile station terminal 403. The eNB communication unit 323 performs transmission and reception of wireless signals with the eNB 200. The down channel reception analysis unit 324 performs reception and analysis for a down channel where a neighboring eNB or HeNB transmit.

The control unit 321 controls respective functional blocks thereof.

Figure 5:
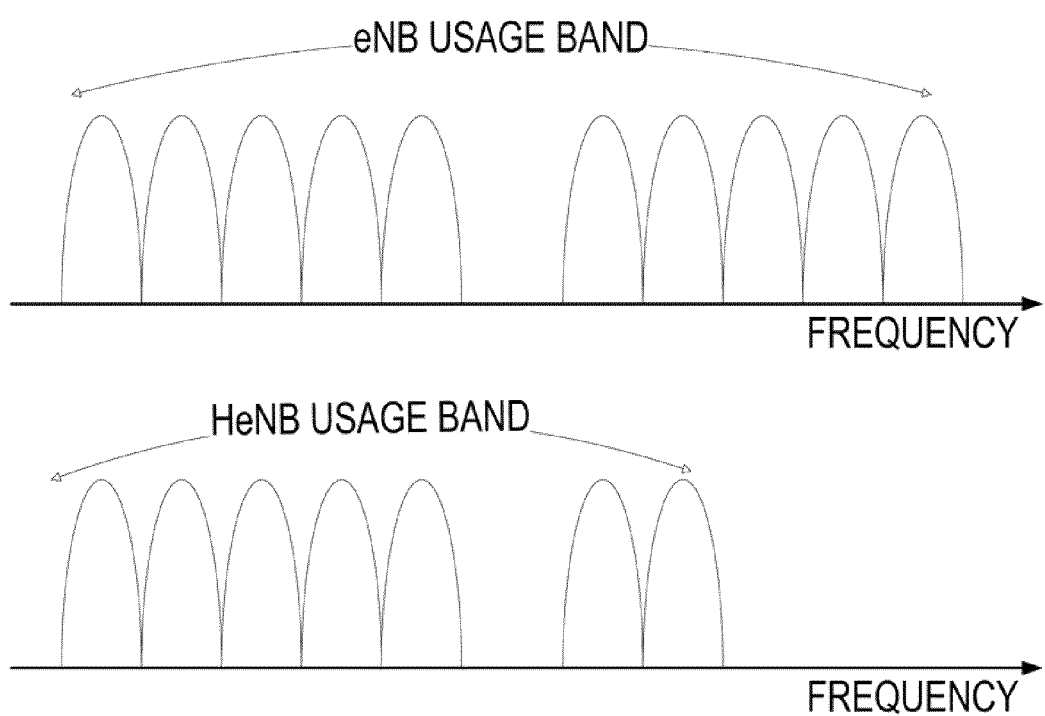
FIG. 5 is a diagram schematically showing wireless bands used by the macro wireless base station apparatus and the home wireless base station apparatus of the second exemplary embodiment.

FIG. 5 is a diagram schematically showing wireless bands used by eNB 200 and the HeNB 300. Since the wireless bands used by eNB 200 and the HeNB 300 overlap in a portion of a frequency axis, radio waves interfere with each other in the overlapping portion.

Figure 6:
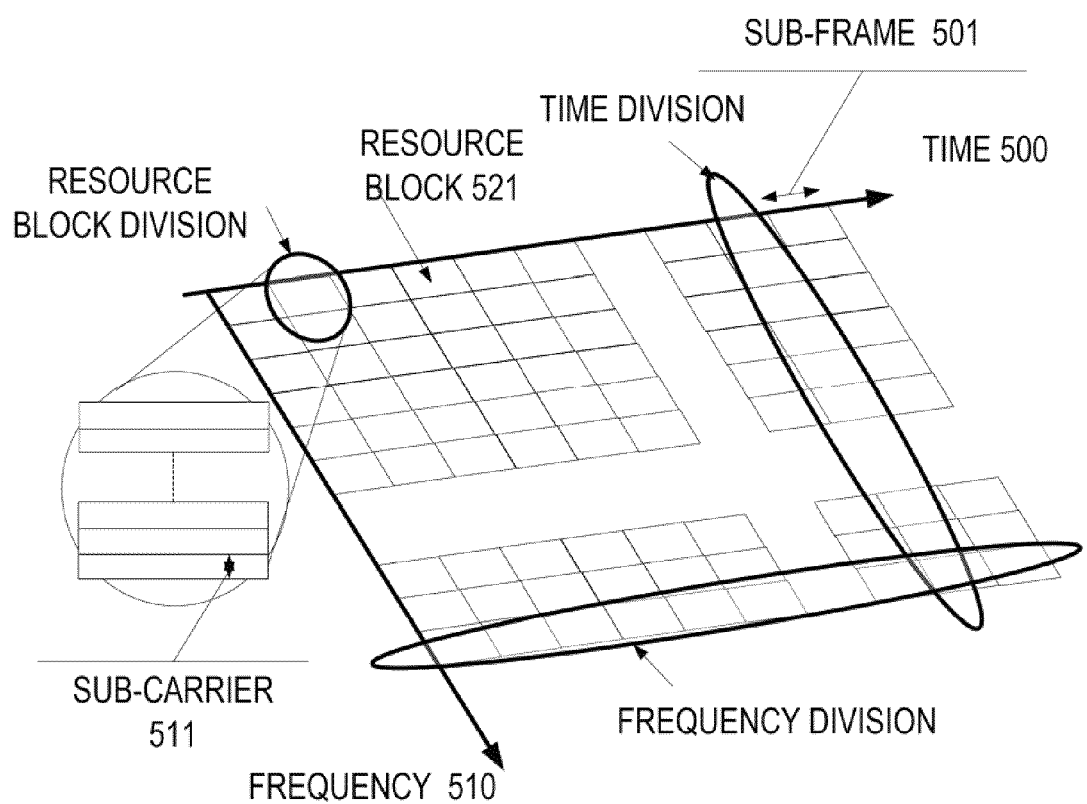
FIG. 6 is a diagram showing wireless resource units managed by the macro wireless base station apparatus and the home wireless base station apparatus of the second exemplary embodiment.

FIG. 6 is a diagram showing units of a wireless resource controlled by eNB 200 and the HeNB 300. The wireless resource can be represented with a time axis 500 and a frequency axis 510. The time axis 500 is divided with a sub-frame 501 as a unit, while the frequency axis 510 is divided with a sub-carrier 511 as a unit.

One block delimited by a sub-frame 501 and a plurality of sub-carriers 511 is called a resource block 521.

Figure 7:
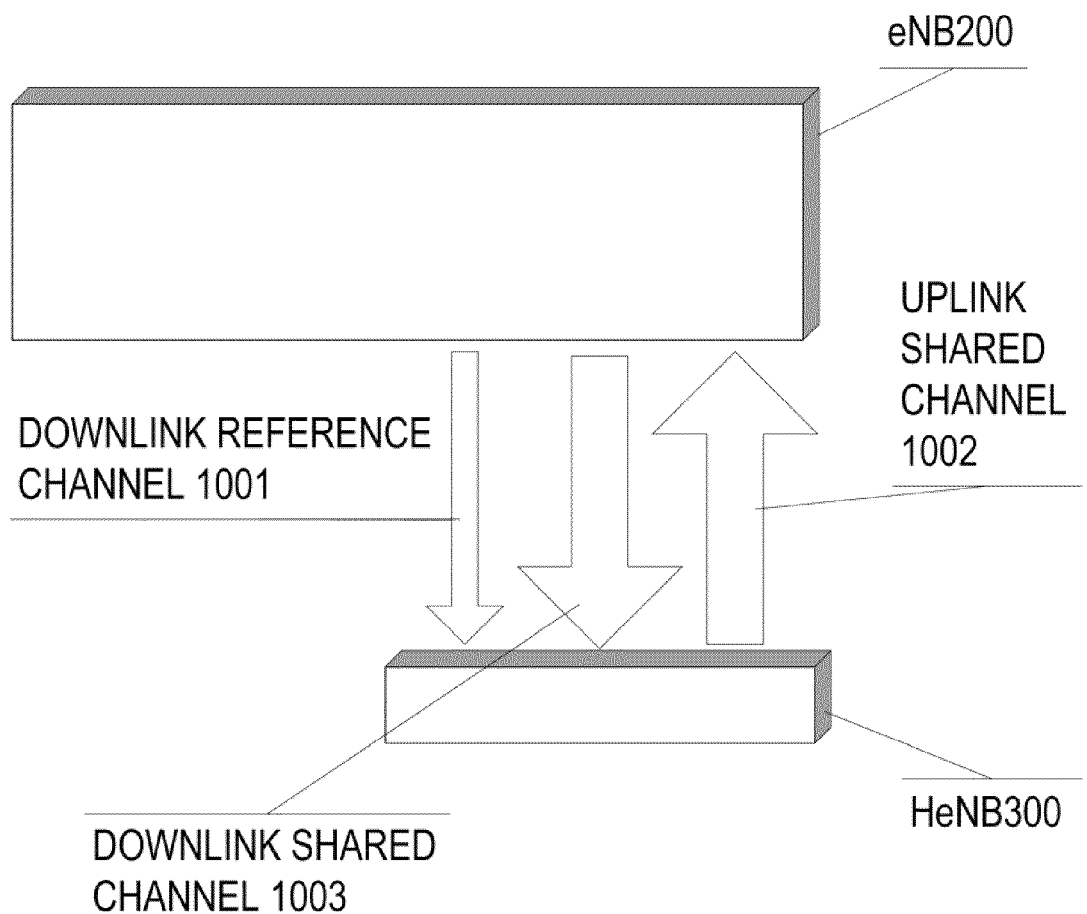
FIG. 7 is a diagram showing a wireless channel used in the second exemplary embodiment.

FIG. 7 is a diagram showing a wireless channel used in the present exemplary embodiment. A downlink reference channel 1001 is a wireless channel for monitoring an interference state with eNB 200, by the HeNB 300. An uplink shared channel 1002 and a downlink shared channel 1003 are wireless channels for performing communication between the HeNB 300 and eNB 200.

(Operation)

Referring to the drawing, a description is given concerning an operation of the eNB 200 and the HeNB 300. In the present exemplary embodiment, the HeNB 300 has a configuration of FIG. 4, and performs a wireless message exchange via the eNB communication unit 323. It is to be noted that a description is given in a third exemplary embodiment concerning a case of performing a message exchange using a wire.

Figure 8:
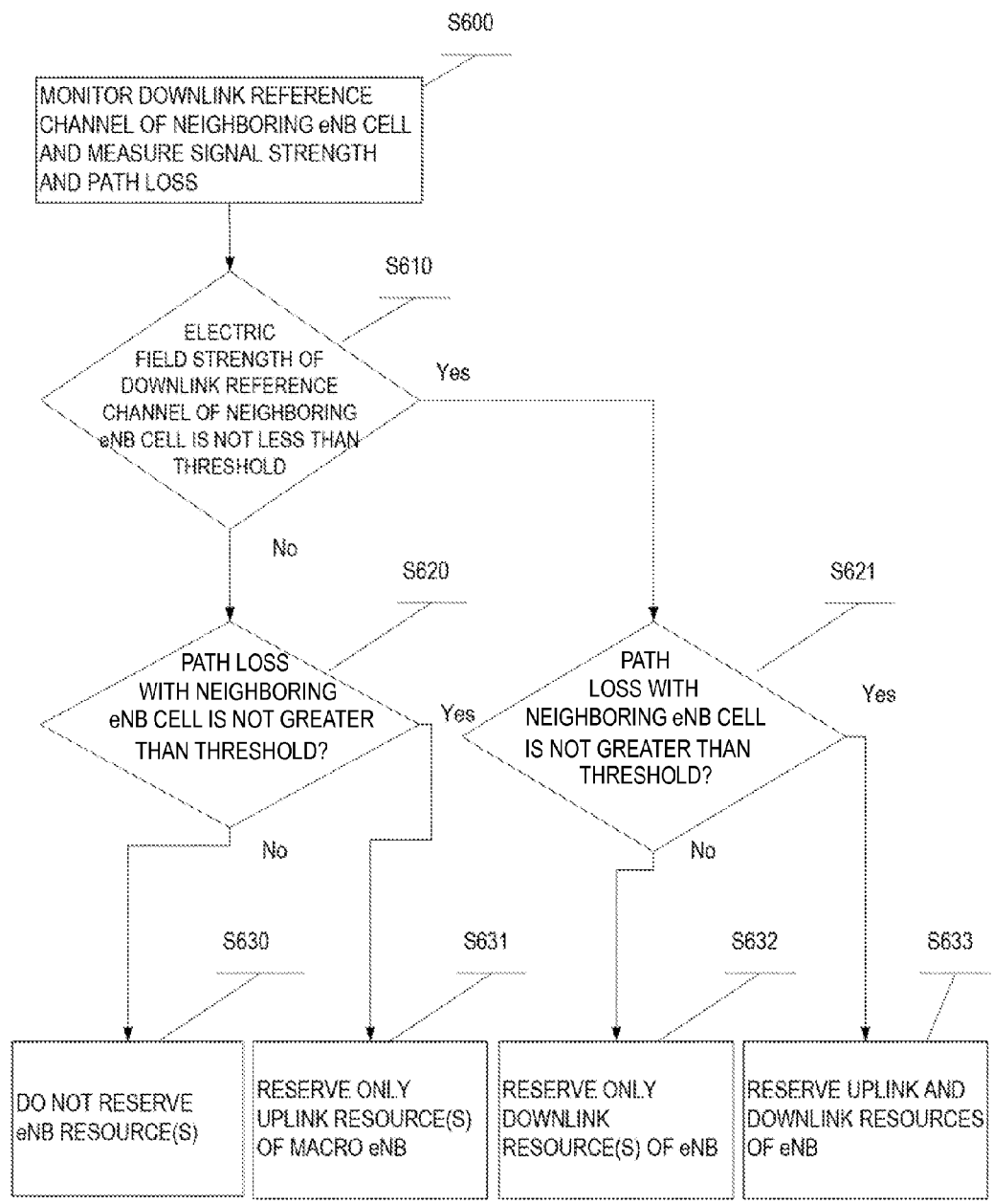
FIG. 8 is a flow chart showing an operation of the home wireless base station apparatus according to the second exemplary embodiment.

FIG. 8 is a flow chart showing an operation of the HeNB 300 according to the present exemplary embodiment. The HeNB 300 judges whether or not to make a wireless resource reservation for the eNB 200 according to the flowchart of FIG. 8.

The HeNB 300 performs reception and analysis for the downlink reference channel 1001, which is a downward directed reference channel where a neighboring eNB 200 transmits, at start time or each fixed period, by the down channel reception analysis unit 324. The HeNB 300 measures the signal strength of the downlink reference channel 1001, and computes path loss between the neighboring macro base station apparatuses eNB 200 and the HeNB (step S600).

The HeNB 300 judges whether or not the signal strength of the downlink reference channel 1001 that receives from the neighboring eNB 200 is not less than a threshold (step S610). In a case of being not less than the threshold (Yes in step S610), the HeNB 300 judges that radio waves in a downward direction of the neighboring eNB 200 form an interference source with radio waves received by the mobile station terminal 403 connected to the HeNB 300.

The HeNB 300 judges whether or not the path loss of the downlink reference channel 1001 that performs reception from the neighboring eNB 200 is not less than a threshold (steps S620 and S621). In a case of being not less than the threshold (Yes in step S620, Yes in step S621), the HeNB 300 judges that radio waves in an upward direction transmitted by the mobile station terminal 403 that is connected to the HeNB 300 are an interference source to radio waves received by the neighboring eNB 200.

In a case where both the signal strength and the path loss are less than the threshold (No in step S610, No in step S620), the HeNB 300 judges that interference does not occur between the HeNB 300 and eNB 200, and does not make a resource reservation (step S630).

In a case where only the path loss is not less than the threshold (No in step S610, Yes in step S620), the HeNB 300 judges that radio waves in an upward direction transmitted by the mobile station terminal 403 that is connected to the HeNB 300 are an interference source to radio waves received by the neighboring macro wireless base station apparatus eNB 200.

In this case, the HeNB 300 reserves in advance an upward directed wireless resource used by the eNB 200, directed to the HeNB 300 (step S631).

In a case where only the signal strength is not less than the threshold (Yes in step S610, No in step S621), the HeNB 300 judges that radio waves in a downward direction of the neighboring eNB 200 are an interference source to radio waves received by the mobile station terminal 403 connected to the HeNB 300. In this case, the HeNB 300 reserves in advance a downward directed wireless resource used by the eNB 200, directed to the HeNB 300 (step S632).

In a case where both the signal strength and the path loss are not less than the threshold (Yes in step S610, Yes in step S621), the HeNB 300 reserves in advance a wireless resource in both upward and downward directions used by the eNB 200, directed to the HeNB 300 (step S633).

It is to be noted that in a case where a coverage area of the HeNB 300 overlaps with a plurality of eNB coverage areas, the HeNB 300 performs processing similar to processing shown in the flowchart of FIG. 8, with respect to each eNB.

Figure 9:
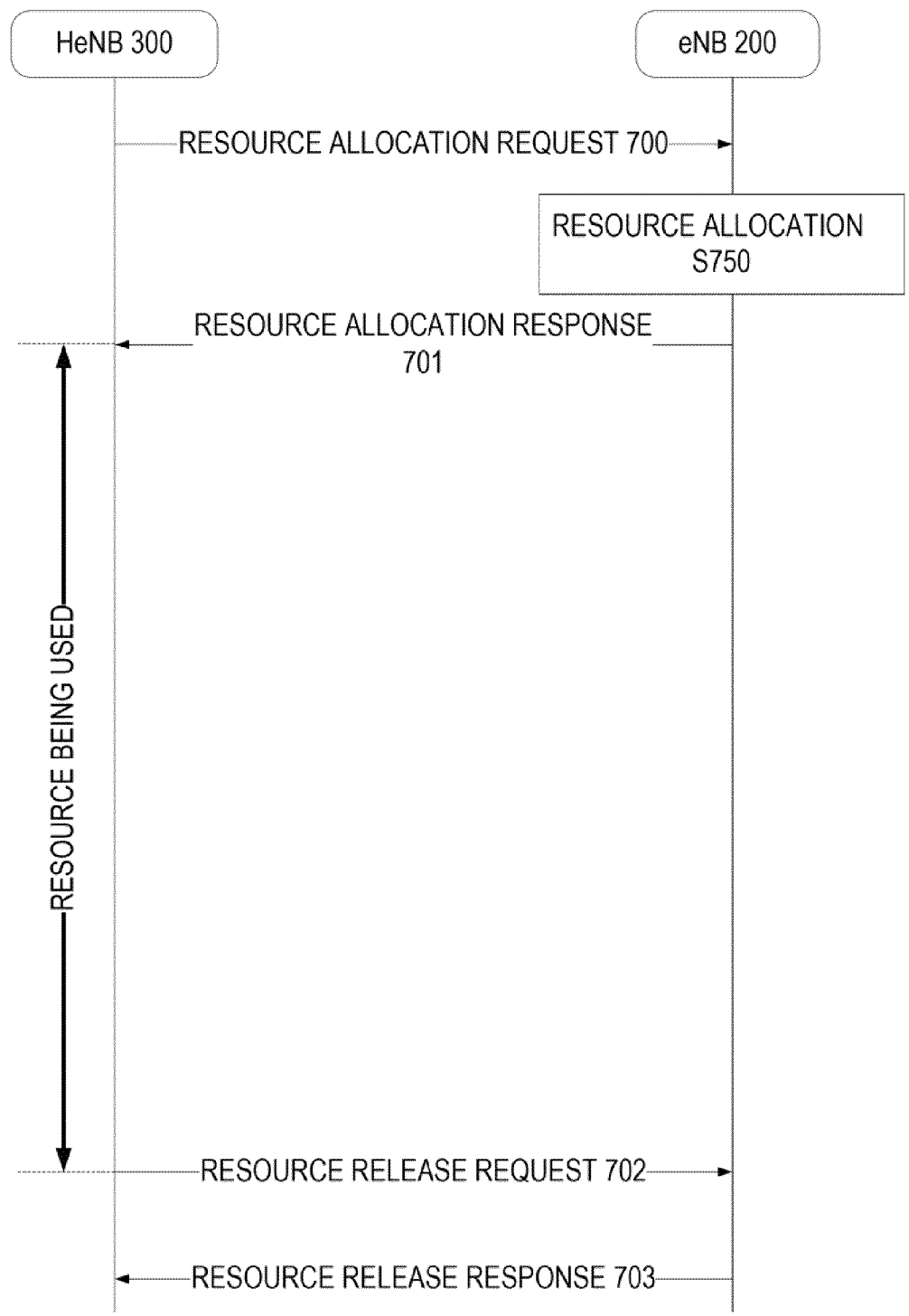
FIG. 9 is a sequence chart of resource allocation and resource release between the home wireless base station apparatus and the macro wireless base station apparatus according to the second exemplary embodiment.

FIG. 9 is a sequence chart showing an operation of resource allocation and resource release between the HeNB 300 and the eNB 200. FIG. 10 shows content of a resource allocation request. Referring to FIG. 9 and FIG. 10, a description is given concerning an operation in which the HeNB 300 reserves a wireless resource of the eNB 200.

In order to reserve the wireless resource of the eNB 200, the HeNB 300 transmits a resource allocation request 700 in an uplink shared channel 1002, via the eNB communication unit 323.

The resource allocation request 700 is transmitted immediately after completion of processing shown in the flowchart of FIG. 8, or is transmitted in a case where the HeNB 300 receives a connection request from the mobile station terminal 403, or is transmitted in a case where the HeNB 300 receives an incoming notification with regard to the mobile station terminal 403 from the high level apparatus SGW/MME 100.

FIG. 10 is a diagram showing a configuration of a resource allocation request in the present exemplary embodiment. Referring to FIG. 10, a resource allocation request 700 message includes a destination eNB identification ID 2001, a source HeNB identification ID 2002, a necessary resource amount 2003, and a neighboring HeNB cell identification ID list 2004.

The HeNB 300 monitors a down channel of surrounding cells at startup time or periodically, and obtains cell IDs of surrounding cells. Based on the obtained IDs, the HeNB 300 generates the destination eNB identification ID 2001 and the neighboring HeNB cell identification ID list 2004.

Immediately after completing the processing shown in the flowchart of FIG. 8, in a case of transmitting the resource allocation request 700, the HeNB 300 gives notification of a resource amount satisfying the maximum data rate in an upward and downward direction supported by the HeNB 300, as the necessary resource amount 2003.

On the other hand, when the resource allocation request 700 is transmitted, in a case of receiving a connection request from the mobile station terminal 403 or in a case of receiving an incoming notification from the SGW/MME 100, the HeNB 300 determines the resource amount in accordance with service type requested by the mobile station terminal 403 or the SGW/MME 100.

The service type can be distinguished by using, for example, QCI (QoS Class Identifier) of TS23.203. For example, it is preferable that, with regard to speech a resource amount satisfying several dozen kbps is requested; with regard to video a resource amount satisfying from approximately several 100 kbps to several Mbps is requested; with regard to web browsing a resource amount of from approximately several 100 kbps to several Mbps is requested; and with regard to uploading or downloading a maximum data rate in an upward or downward direction supported by the HeNB 300 is requested.

The resource amount requested with respect to each QCI is preferably held as a parameter whose setting can be changed.

It is to be noted that as a result of processing shown in the flowchart of FIG. 8, in a case where the HeNB 300 judges that it is necessary to reserve a wireless resource with regard to a plurality of eNBs, the HeNB 300 transmits a resource allocation request 700 to each eNB.

Figure 11:
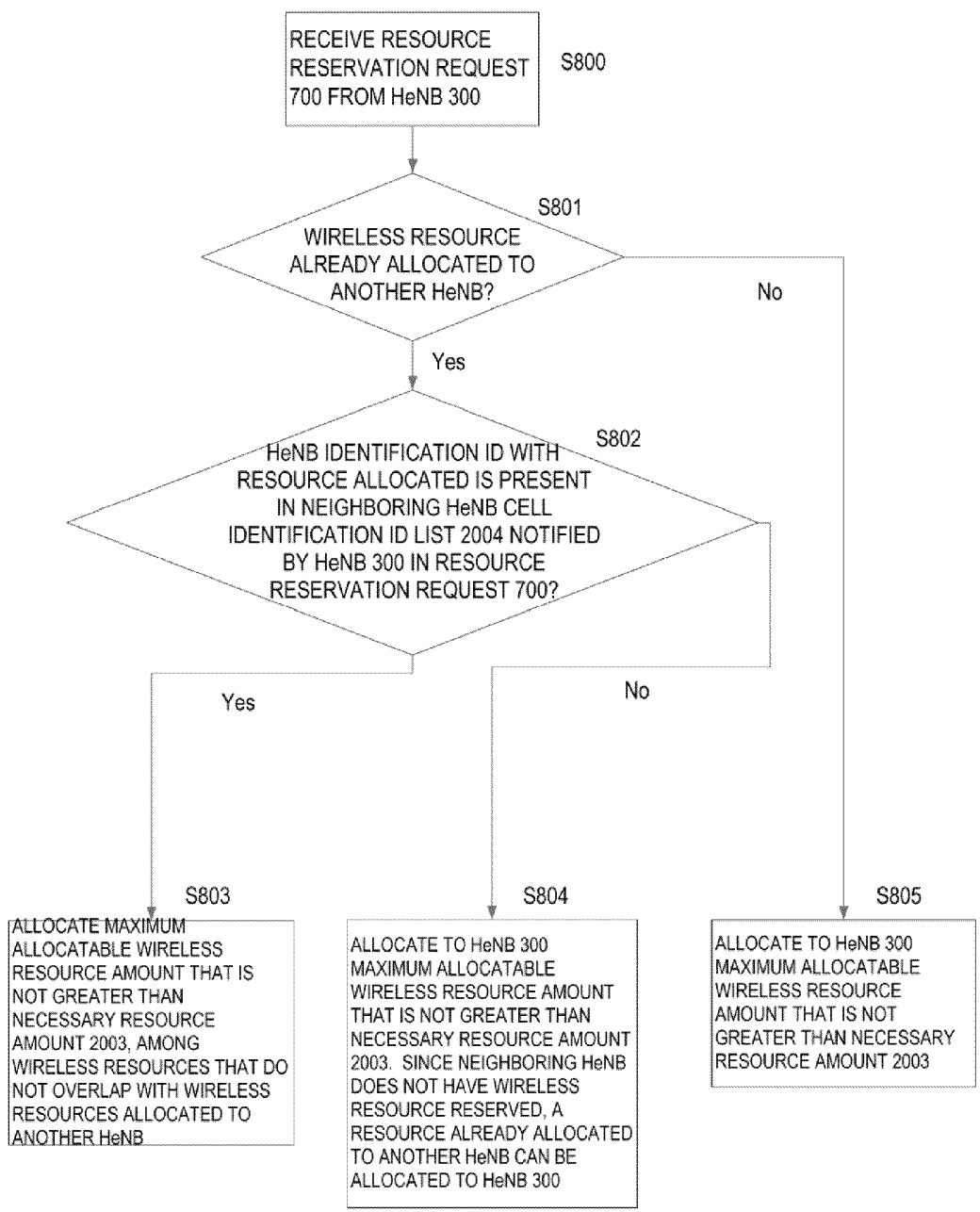
FIG. 11 is a flow chart showing an operation of the macro wireless base station apparatus according to the second exemplary embodiment.

FIG. 11 is a flow chart showing an operation of the eNB 200 according to the present exemplary embodiment. In a case of receiving the resource allocation request 700, the eNB 200 allocates a resource according to the flowchart shown in FIG. 11 (step S750 in FIG. 9).

The eNB 200 receives the resource allocation request 700 from the HeNB 300 (step S800).

The eNB 200 judges whether or not the wireless resource has been allocated to another HeNB already (step S801).

Figure 15:
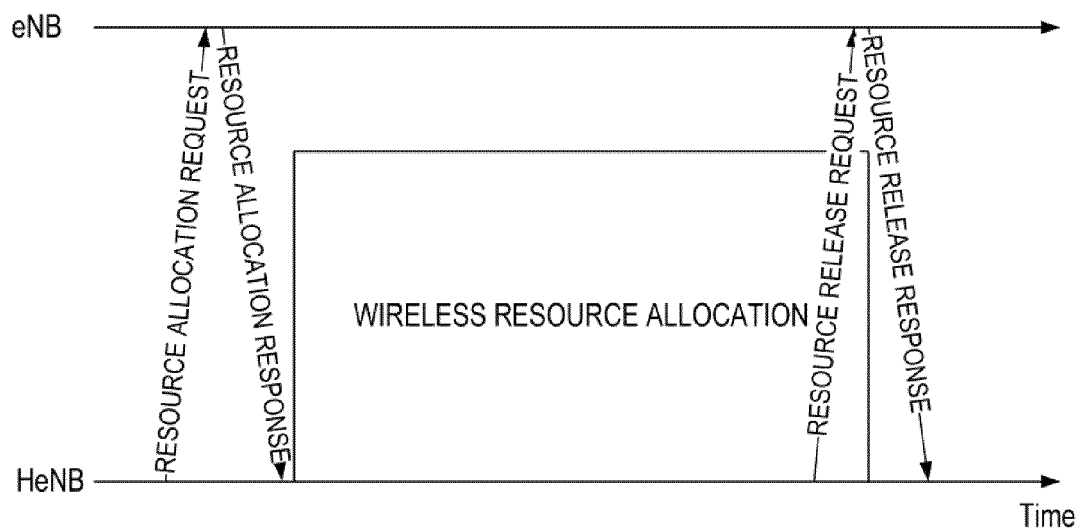
FIG. 15 is a diagram for describing a resource allocation method according to the second exemplary embodiment.

In a case where a wireless resource is not allocated to another HeNB (No in step S801), as shown in FIG. 15, the eNB 200 allocates the maximum wireless resource amount that can be allocated to the HeNB 300 by the eNB 200 at present, to the HeNB 300, not greater than the necessary resource amount 2003 notified by the HeNB 300 in the resource allocation request 700 (step S805). The eNB 200, as an example, may allocate a wireless resource once, as shown in FIG. 15.

In a case where the wireless resource has been allocated to another HeNB already (Yes in step 801), the eNB 200 judges whether or not an HeNB identification ID, for which a resource has already been allocated, is present in the neighboring HeNB cell identification ID list 2004 notified in the resource allocation request 700 by the HeNB 300 (step S802).

Figure 13:
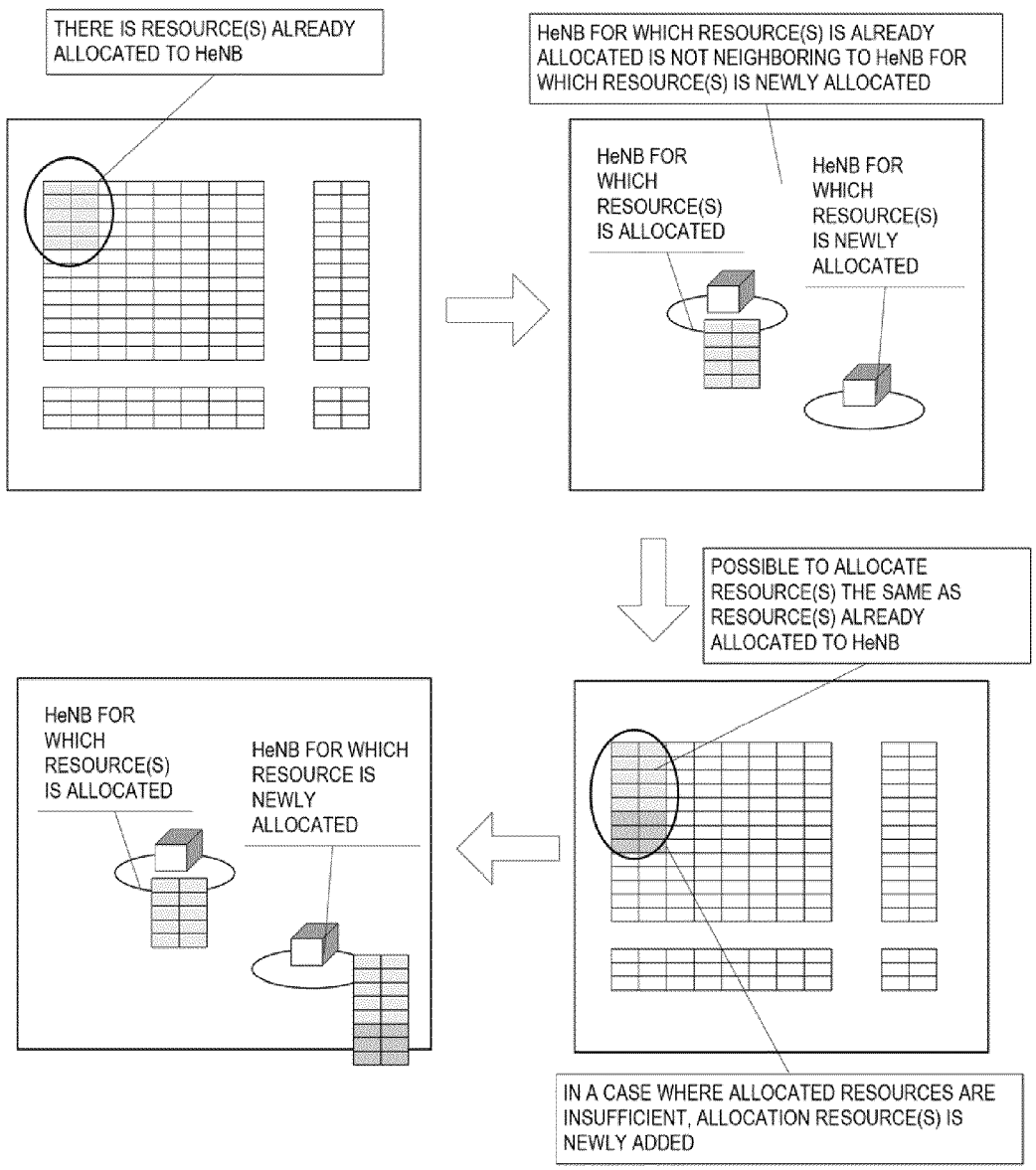
FIG. 13 is a diagram for describing resource allocation processing according to the macro wireless base station apparatus in the second exemplary embodiment.

In a case where the ID in question is not present in the neighboring HeNB cell identification ID list 2004 (No in step 802), the eNB 200 allocates the maximum wireless resource amount that can be allocated, not greater than the necessary resource amount 2003, with respect to HeNB ID #1 (step S804). In this case, as shown in FIG. 13, since a neighboring HeNB has not reserved a wireless resource, it is possible to allocate a resource already allocated to another HeNB to the HeNB ID #1.

Figure 12:
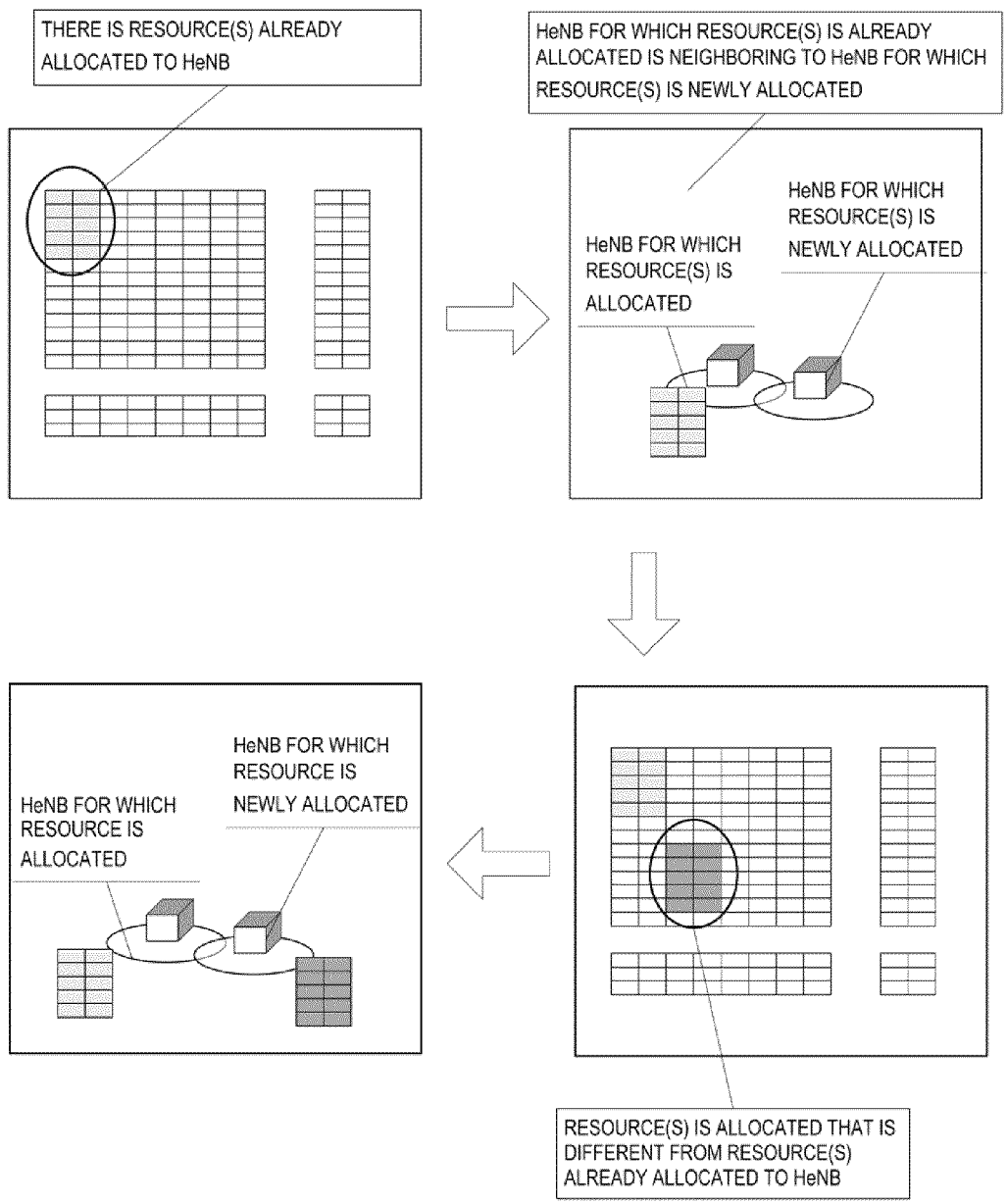
FIG. 12 is a diagram for describing resource allocation processing according to the macro wireless base station apparatus in the second exemplary embodiment.

In a case where an HeNB identification ID for which a resource is already allocated is present in the neighboring HeNB cell identification ID list 2004 notified in the resource allocation request 700 by the HeNB 300 (Yes in step 802), the eNB 200 allocates the maximum wireless source amount that can be allocated, not greater than the necessary resource amount 2003, among wireless resources that do not overlap with a wireless resource already allocated to another HeNB as shown in FIG. 12 (step S803).

After determining a wireless resource to be allocated in accordance with the flowchart shown in FIG. 11, the eNB 200 transmits a resource allocation response 701 to the HeNB 300. FIG. 14 is a diagram showing a configuration of a resource allocation response in the present exemplary embodiment. Referring to FIG. 14, the resource allocation response 701 includes a destination HeNB identification ID 3001, a source eNB identification ID 3002, and a given resource amount 3003.

In a case where usage of the wireless resource is ended, the HeNB 300 transmits a resource release request 702 via an uplink shared channel 1002 to the eNB 200, and gives notification to the effect that usage of the wireless resource is ended.

After receiving the resource release request 702, the eNB 200 releases an allocated resource in resource allocation (step 750 in FIG. 9) with respect to the HeNB ID in question, and replies with a resource release response 703 via the downlink shared channel 1003 to the HeNB 300.

In a case where interference with a neighboring eNB 200 is expected, the HeNB 300 requests allocation of a wireless resource with respect to the eNB 200, in the abovementioned flow, and uses only the allocated wireless resource, to perform data communication with the mobile station terminal 403 under the HeNB 300. In this case, the data rate between the HeNB 300 and the mobile station terminal 403 is limited by allocated wireless resources.

(Effect)

In the present exemplary embodiment, in order to avoid interference with the macro wireless base station apparatus, the home wireless base station apparatus makes a reservation of a frequency carrier (wireless resource) with respect to the macro wireless base station apparatus.

By making the reservation of a frequency carrier (wireless resource) only when necessary, the time in which the frequency carrier (wireless resource) is allocated with respect to the home wireless base station apparatus is limited. Therefore, even when a setup of the home wireless base station apparatus is arranged, the data rate that can be provided by the macro wireless base station apparatus is not significantly decreased.

Furthermore, in the present exemplary embodiment, in a case where home wireless base station apparatuses are not neighboring each other, the macro wireless base station apparatus performs resource scheduling to overlap and allocate the same frequency carrier (wireless resource) to the home wireless base station apparatuses. This may be realized, for example, by the home wireless base station apparatus giving a notification of a neighboring home wireless base station apparatus ID to the macro wireless base station apparatus. In this case, even in a case where a plurality of home wireless base station apparatuses are set up under the macro wireless base station apparatus, the data rate that can be provided by the macro wireless base station apparatus does not decrease in proportion to the number of HeNBs.

Furthermore, in the present exemplary embodiment, the home wireless base station apparatus changes the amount of frequency carriers (wireless resources) reserved in accordance with services requested by the mobile station terminal. That is, the home wireless base station apparatus gives notification to the macro wireless base station apparatus of the necessary resource amount. This may be realized, for example, by defining a necessary resource amount in accordance with QCI (QoS Class Identifier) and giving notification of the necessary resource amount to the macro wireless base station apparatus. In this case, it is possible to avoid reserving unnecessary resources such as reserving several dozen Mbps for communication of speech data.

From the above, according to the wireless communication system related to the present exemplary embodiment, it is possible to not only avoid interference problems between the macro wireless base station apparatus and the home wireless base station apparatus, but it is also possible to curtail the amount of decrease of useable frequency carriers limited by the macro wireless base station apparatus. This is because the home wireless base station apparatus requests a necessary resource amount for each service, and the macro wireless base station apparatus allocates the same wireless carrier with respect to a plurality of home wireless base station apparatuses that are not neighboring. Furthermore, by the home wireless base station apparatus requesting the necessary resource allocation on a case-by-case basis, the time in which useable frequency carriers decrease in the macro wireless base station apparatus can be shortened.

Third Exemplary Embodiment

A description is given concerning a wireless base station apparatus according to a third exemplary embodiment, making reference to the drawings. In the second exemplary embodiment, a message resource allocation request 700, a resource allocation response 701, a resource release request 702, and a resource release response 703, shown in FIG. 9, are transmitted and received via an uplink shared channel 1002 and a downlink shared channel 1003 among wireless channels shown in FIG. 7. Meanwhile, it is possible to perform transmission and reception via a wired line (S1 interface) linking HeNB 300 and SGW/MME 100, and eNB 200 and SGW/MME 100.

Figure 17:
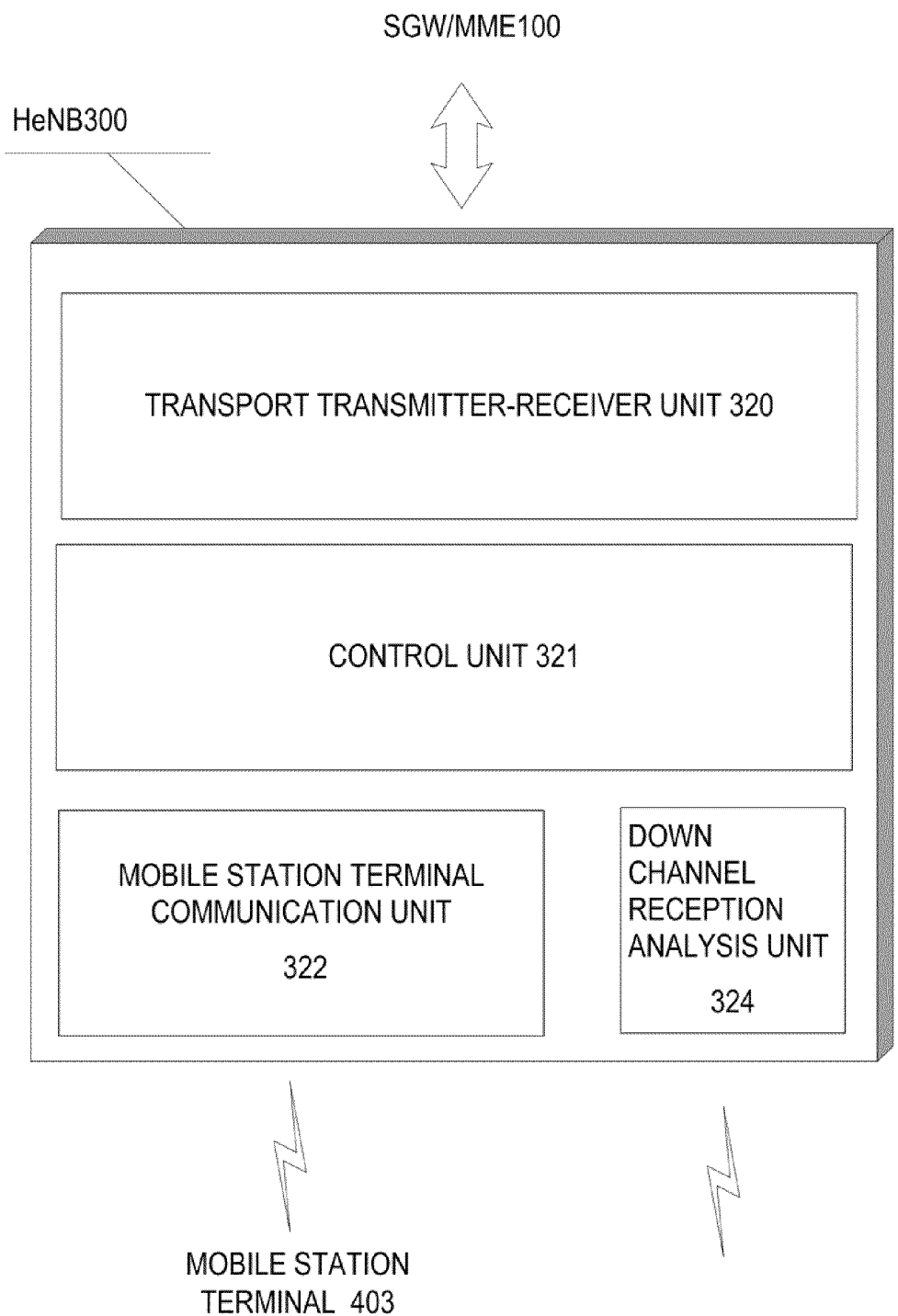
FIG. 17 is a block diagram showing a configuration of a home wireless base station apparatus according to a third exemplary embodiment.

FIG. 17 is a block diagram showing a configuration of a home wireless base station apparatus according to the present exemplary embodiment. FIG. 17 is a block diagram showing a configuration of the home wireless base station apparatus in a case of performing a message exchange with the eNB 200 via the wired line. In this case, different from a configuration shown in FIG. 4, the HeNB 300 does not have an eNB communication unit 323 that performs wireless signal transmission and reception with the eNB 200.

In the present exemplary embodiment, a resource allocation request, a resource reservation response, a resource release request and a resource release response are added as new messages to an application protocol in the S1 interface.

Fourth Exemplary Embodiment

Figure 18:
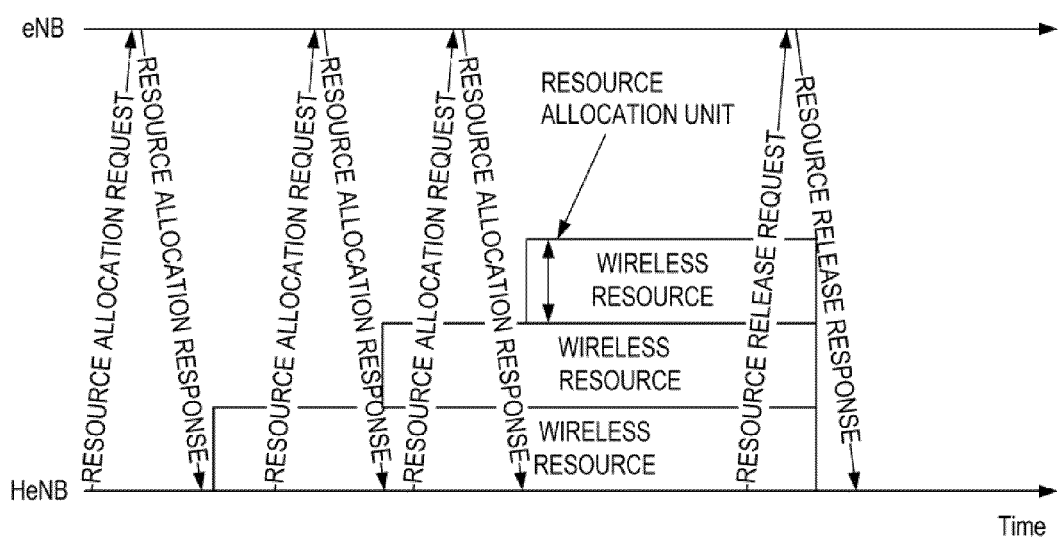
FIG. 18 is a diagram for describing a resource allocation method according to a fourth exemplary embodiment.

A description is given concerning a wireless base station apparatus according to a fourth exemplary embodiment, making reference to the drawings. With regard to a process 803, a process 804, and a process 805 in a flow of FIG. 11, in an earlier exemplary embodiment, the maximum wireless resource amount that can be allocated, not greater than a necessary resource amount 2003 is allocated at once, as shown in FIG. 15. FIG. 18 is a diagram for describing a resource allocation method according to the present exemplary embodiment. As shown in FIG. 18, with a wireless resource allocation unit defined in advance, it is possible to allocate wireless resources in stages, in the pre-defined units, each time a resource allocation request 700 is received.

In a case of receiving a resource allocation request, when allocating the maximum resource that can be allocated, the earlier the order in which the resource allocation request 700 is received, the higher the probability of there being more wireless resources that can be allocated. On the other hand, it is possible to realize uniformity of the wireless resource allocation amount among HeNBs, by allocating the wireless resources in stages.

Fifth Exemplary Embodiment

Figure 16:
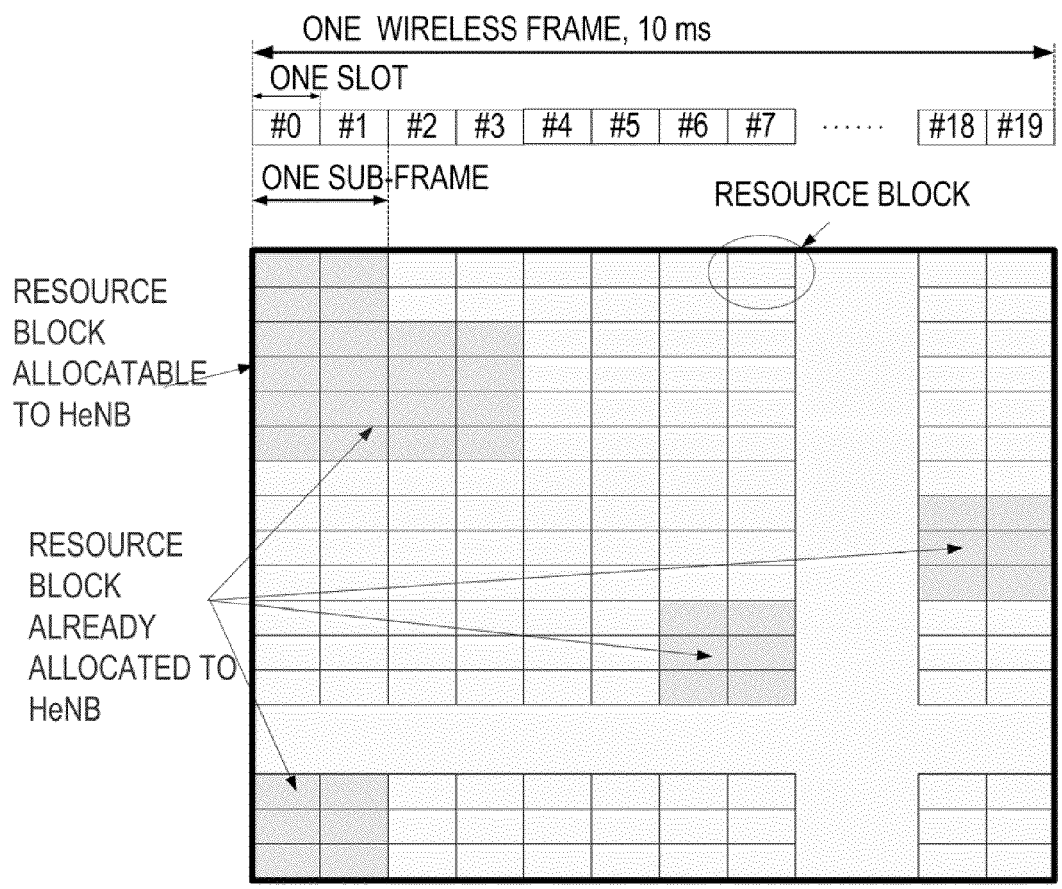
FIG. 16 is a diagram for describing a resource allocation unit in the second exemplary embodiment.
Figure 19:
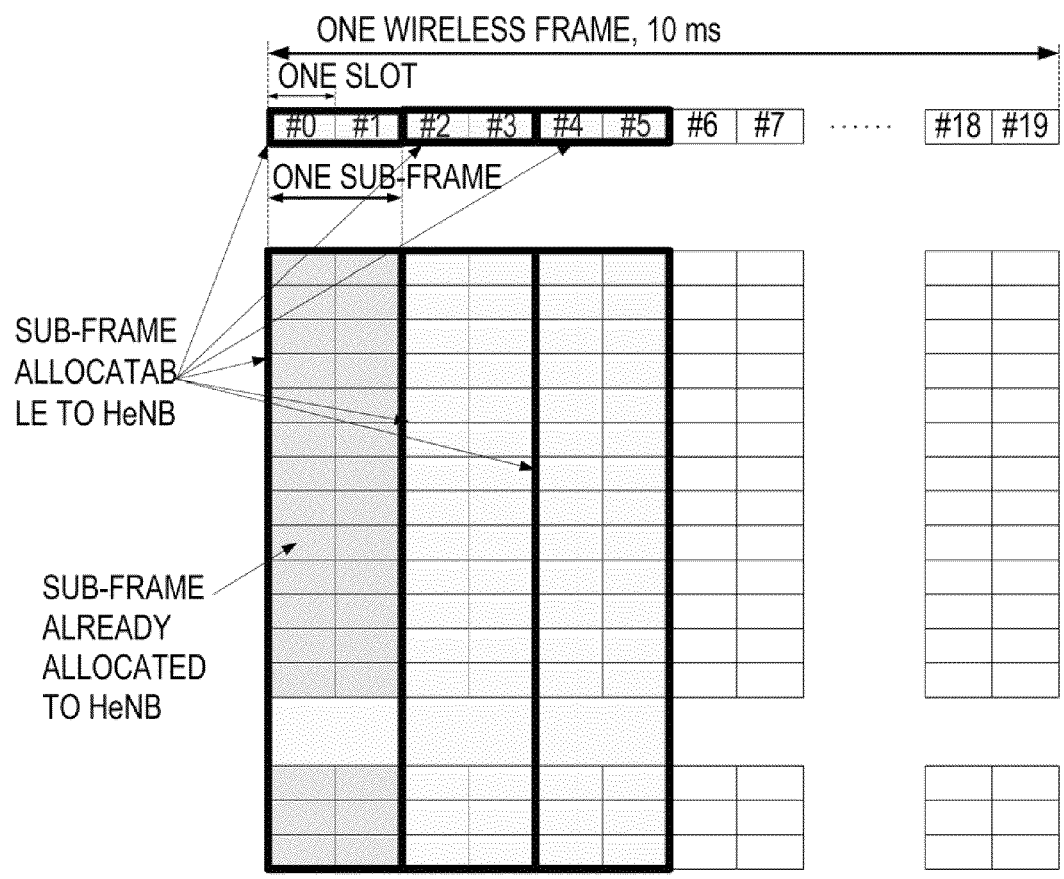
FIG. 19 is a diagram for describing a resource allocation unit in a fifth exemplary embodiment.

A description is given concerning a wireless base station apparatus according to a fifth exemplary embodiment, making reference to the drawings. A minimum unit of a wireless resource allocated to a home wireless base station apparatus by a macro wireless base station apparatus, in the second exemplary embodiment has a resource block 521 as a unit, as shown in FIG. 16. FIG. 19 is a diagram for describing a resource allocation unit according to the present exemplary embodiment. As shown in FIG. 19, a sub-frame 501 may also be the minimum unit.

Here, a resource block 521 is a block divided into the sub-frame 501 and 12 sub-carriers 511. Using one resource block relates to using the 12 sub-carriers 511 with one sub-frame (1 ms).

When one sub-frame is used, all sub-carriers 511 are used across one sub-frame (1 ms), independent of the number of the sub-carriers 511.

The above description was made based on the exemplary embodiments, but the present invention is not limited to the abovementioned exemplary embodiments.

It is to be noted that that each disclosure of the abovementioned patent document is incorporated herein by reference thereto. Modifications and adjustments of embodiments and examples are possible within the bounds of the entire disclosure (including the scope of the claims) of the present invention, and also based on fundamental technological concepts thereof. Furthermore, a wide variety of combinations and selections of various disclosed elements is possible within the scope of the claims of the present invention. That is, the present invention clearly includes every type of transformation and modification that a person skilled in the art can realize according to the entire disclosure including the scope of the claims and to technological concepts thereof.

It is to be noted that a portion or all of the abovementioned exemplary embodiments can be described as in the following appendices, but not restricted thereto.

(Further Mode 1)

A wireless communication system, comprising: a first wireless base station apparatus that covers a first cell; and a second wireless base station apparatus that covers a second cell that is wider than the first cell and overlaps at least a portion of the first cell, wherein: in a case of performing communication with a mobile station terminal included in the first cell, the first wireless base station apparatus makes reference to communication quality of the second cell, judges whether or not a wireless resource(s) of the second wireless base station apparatus is to be reserved, and, when a judgment is made that reservation of the wireless resource is necessary, transmits a wireless resource allocation request including a necessary resource amount to the second wireless base station apparatus; and in a case of receiving the wireless resource allocation request from the first wireless base station apparatus, the second wireless base station apparatus allocates a wireless resource(s) in accordance with the necessary resource amount to the first wireless base station apparatus.

(Further Mode 2)

The wireless communication system according to further mode 1, wherein: the communication quality relates to signal strength and path loss in a downlink reference channel of the second cell.

(Further Mode 3)

The wireless communication system according to further mode 1 or 2, wherein: in a case where the signal strength is not less than a prescribed threshold, the first wireless base station apparatus reserves a wireless resource(s) of a downlink of the second wireless base station apparatus.

(Further Mode 4)

The wireless communication system according to any one of further modes 1 to 3, wherein: in a case where path loss is not less than a prescribed threshold, the first wireless base station apparatus reserves an uplink wireless resource(s) of the second wireless base station apparatus.

(Further Mode 5)

The wireless communication system according to any one of further modes 1 to 4, wherein: the necessary resource amount is a resource amount that satisfies a maximum data rate in an upward and a downward direction supported by the first wireless base station apparatus.

(Further Mode 6)

The wireless communication system according to any one of further modes 1 to 4, wherein: the necessary resource amount is a resource amount according to type/kind of service requested by the mobile station terminal.

(Further Mode 7)

The wireless communication system according to any one of further modes 1 to 4, wherein: the necessary resource amount is a resource amount according to type/kind of service requested by a higher-level control apparatus of the first wireless base station apparatus and the second wireless base station apparatus.

(Further Mode 8)

The wireless communication system according to any one of further modes 1 to 7, wherein: in a case of receiving the wireless resource allocation request from the first wireless base station apparatus, the second wireless base station apparatus allocates maximum allocatable wireless resources, not greater than the necessary resource amount, to the first wireless base station apparatus.

(Further Mode 9)

The wireless communication system according to any one of further modes 1 to 8, wherein: in a case of receiving the wireless resource allocation request from the first wireless base station apparatus, when a third cell, covered by a third wireless base station to which a wireless resource(s) is already allocated by the second wireless base station apparatus, and the first cell do not overlap, the second wireless base station apparatus allocates to the first wireless base station apparatus a wireless resource(s) at least partially overlapping the wireless resource(s) allocated to the third wireless base station.

(Further Mode 10)

The wireless communication system according to any one of further modes 1 to 9, wherein: each time the wireless resource allocation request is received from the first wireless base station apparatus, the second wireless base station apparatus sequentially allocates a wireless resource(s) of a prescribed resource amount.

(Further Mode 11)

The wireless communication system according to any one of further modes 1 to 10, wherein: the second wireless base station apparatus allocates wireless resources with a resources block as a unit.

(Further Mode 12)

The wireless communication system according to any one of further modes 1 to 10, wherein: the second wireless base station apparatus allocates wireless resources with a subframe as a unit.

(Further Mode 13)

The wireless communication system according to any one of further modes 1 to 12, wherein: the first wireless base station apparatus and the third wireless base station apparatus are a home wireless base station apparatus.

(Further Mode 14)

The wireless communication system according to any one of further modes 1 to 13, wherein: the second wireless base station apparatus is a macro wireless base station apparatus.

(Further Mode 15)

A first wireless base station apparatus that covers a first cell, wherein: in a case of performing communication with a mobile station terminal included in the first cell, the first wireless base station apparatus makes reference to communication quality of a second cell that is wider than the first cell and overlaps at least a portion of the first cell, judges whether or not a wireless resource(s) of a second wireless base station apparatus that covers the second cell is to be reserved, and, when a judgment is made that reservation of the wireless resource(s) is necessary, transmits a wireless resource allocation request including a necessary resource amount to the second wireless base station apparatus.

(Further Mode 16)

A second wireless base station apparatus that covers a second cell that is wider than a first cell covered by a first wireless base station apparatus and overlaps at least a portion of the first cell, wherein: in a case of receiving from the first wireless base station apparatus a wireless resource allocation request including a necessary resource amount with regard to the first wireless base station apparatus, the second wireless base station apparatus allocates a wireless resource(s) in accordance with the necessary resource amount to the first wireless base station apparatus.

(Further Mode 17)

A wireless communication method, comprising: in a case of performing communication with a mobile station terminal included in a first cell, by a first wireless base station apparatus that covers the first cell, making reference to communication quality of a second cell that is wider than the first cell and overlaps at least a portion of the first cell, and judging whether or not a wireless resource(s) of a second wireless base station apparatus that covers the second cell is to be reserved; in a case of judging that reservation of the wireless resource(s) is necessary, by the first wireless base station apparatus, transmitting a wireless resource allocation request including a necessary resource amount to the second wireless base station apparatus; and in a case of receiving the wireless resource allocation request from the first wireless base station apparatus, by the second wireless base station apparatus, allocating a wireless resource(s) in accordance with the necessary resource amount to the first wireless base station apparatus.

(Further Mode 18)

A wireless communication method, comprising: in a case of performing communication with a mobile station terminal included in a first cell, by a first wireless base station apparatus that covers the first cell, making reference to communication quality of a second cell that is wider than the first cell and overlaps at least a portion of the first cell, and judging whether or not a wireless resource(s) of a second wireless base station apparatus that covers the second cell is to be reserved; and in a case of judging that reservation of the wireless resource(s) is necessary, by the first wireless base station apparatus, transmitting a wireless resource allocation request including a necessary resource amount to the second wireless base station apparatus.

(Further Mode 19)

A wireless communication method, comprising: by a second wireless base station apparatus that covers a second cell that is wider than a first cell covered by a first wireless base station apparatus and overlaps at least a portion of the first cell, receiving from the first wireless base station apparatus a wireless resource allocation request including a resource amount that is necessary with regard to the first wireless base station apparatus; and by the second wireless base station apparatus, allocating a wireless resource(s) in accordance with the necessary resource amount to the first wireless base station apparatus.

(Further Mode 20)

A program causing a CPU of a first wireless base station apparatus to execute: when communication is performed with a mobile station terminal included in a first cell covered by the first wireless base station apparatus, making reference to communication quality of a second cell that is wider than the first cell and overlaps at least a portion of the first cell, and judging whether or not a wireless resource(s) of a second wireless base station apparatus that covers the second cell is to be reserved; and in a case of judging that reservation of the wireless resource(s) is necessary, transmitting a wireless resource allocation request including a necessary resource amount to the second wireless base station apparatus.

(Further Mode 21)

A program causing a CPU of a second wireless base station apparatus that covers a second cell that is wider than a first cell and overlaps at least a portion of the first cell to execute: receiving from a first wireless base station apparatus that covers the first cell a wireless resource allocation request including a resource amount that is necessary with regard to the first wireless base station apparatus; and allocating a wireless resource(s) in accordance with the necessary resource amount to the first wireless base station apparatus.

What is claimed is:

1. A wireless communication system, comprising:
   a first wireless base station apparatus that covers a first cell; and
   a second wireless base station apparatus that covers a second cell that is wider than the first cell and overlaps at least a portion of the first cell, wherein:
   in a case of performing communication with a mobile station terminal included in the first cell, the first wireless base station apparatus makes reference to communication quality of the second cell, judges based on the communication quality whether or not a wireless resource(s) of the second wireless base station apparatus is to be reserved, and, when a judgment is made that reservation of the wireless resource is necessary, transmits a wireless resource allocation request including a necessary resource amount to the second wireless base station apparatus;
   in a case of receiving the wireless resource allocation request from the first wireless base station apparatus, the second wireless base station apparatus allocates a wireless resource(s) in accordance with the necessary resource amount to the first wireless base station apparatus; and
   in a case of receiving the wireless resource allocation request from the first wireless base station apparatus, when a third cell, covered by a third wireless base station to which a wireless resource(s) is already allocated by the second wireless base station apparatus, and the first cell do not overlap, the second wireless base station apparatus allocates to the first wireless base station apparatus a wireless resource at least partially overlapping the wireless resource(s) allocated to the third wireless base station.

2. The wireless communication system according to claim 1, wherein:
   the communication quality relates to signal strength and path loss in a downlink reference channel of the second cell.

3. The wireless communication system according to claim 1, wherein:
   in a case where signal strength is not less than a prescribed threshold, the first wireless base station apparatus reserves a wireless resource(s) of a downlink of the second wireless base station apparatus.

4. The wireless communication system according to claim 1, wherein:
   in a case where path loss is not greater than a prescribed threshold, the first wireless base station apparatus reserves an uplink wireless resource(s) of the second wireless base station apparatus.

5. The wireless communication system according to claim 1, wherein:
   the necessary resource amount is a resource amount that satisfies a maximum data rate in an upward and a downward direction supported by the first wireless base station apparatus.

6. The wireless communication system according to claim 1, wherein:
   the necessary resource amount is a resource amount according to type/kind of service requested by the mobile station terminal.

7. The wireless communication system according to claim 1, wherein:
   the necessary resource amount is a resource amount according to type of service requested by a higher-level control apparatus of the first wireless base station apparatus and the second wireless base station apparatus.

8. The wireless communication system according to claim 1, wherein:
   in a case of receiving the wireless resource allocation request from the first wireless base station apparatus, the second wireless base station apparatus allocates maximum allocatable wireless resources, not greater than the necessary resource amount, to the first wireless base station apparatus.

9. The wireless communication system according to claim 1, wherein:
   each time the wireless resource allocation request is received from the first wireless base station apparatus, the second wireless base station apparatus sequentially allocates a wireless resource(s) of a prescribed resource amount.

10. The wireless communication system according to claim 1, wherein:
    the second wireless base station apparatus allocates wireless resources with a resource block as a unit.

11. The wireless communication system according to claim 1, wherein:
    the second wireless base station apparatus allocates wireless resources with a sub-frame as a unit.

12. The wireless communication system according to claim 1, wherein:
    the first wireless base station apparatus and the third wireless base station apparatus are a home wireless base station apparatus.

13. The wireless communication system according to claim 1, wherein:
    the second wireless base station apparatus is a macro wireless base station apparatus.

14. A first wireless base station apparatus that covers a first cell, wherein:
    in a case of performing communication with a mobile station terminal included in the first cell, the first wireless base station apparatus makes reference to communication quality of a second cell that is wider than the first cell and overlaps at least a portion of the first cell, judges based on the communication quality whether or not a wireless resource(s) of a second wireless base station apparatus that covers the second cell is to be reserved, and, when a judgment is made that reservation of the wireless resource(s) is necessary, transmits a wireless resource allocation request including a necessary resource amount to the second wireless base station apparatus; and in a case of receiving the wireless resource allocation request from the first wireless base station apparatus, when a third cell, covered by a third wireless base station to which a wireless resource(s) is already allocated by the second wireless base station apparatus, and the first cell do not overlap, the second wireless base station apparatus allocates to the first wireless base station apparatus a wireless resource at least partially overlapping the wireless resource(s) allocated to the third wireless base station.

15. A second wireless base station apparatus that covers a second cell that is wider than a first cell covered by the first wireless base station apparatus according to claim 14 and overlaps at least a portion of the first cell, wherein:

in a case of receiving from the first wireless base station apparatus a wireless resource allocation request including a necessary resource amount with regard to the first wireless base station apparatus, the second wireless base station apparatus allocates a wireless resource(s) in accordance with the necessary resource amount to the first wireless base station apparatus.

16. A wireless communication method, comprising:

in a case of performing communication with a mobile station terminal included in a first cell, by a first wireless base station apparatus that covers the first cell, making reference to communication quality of a second cell that is wider than the first cell and overlaps at least a portion of the first cell, and judging based on the communication quality whether or not a wireless resource(s) of a second wireless base station apparatus that covers the second cell is to be reserved;

in a case of judging that reservation of the wireless resource(s) is necessary, by the first wireless base station apparatus, transmitting a wireless resource allocation request including a necessary resource amount to the second wireless base station apparatus; and in a case of receiving the wireless resource allocation request from the first wireless base station apparatus, when a third cell, covered by a third wireless base station to which a wireless resource(s) is already allocated by the second wireless base station apparatus, and the first cell do not overlap, by the second wireless base station apparatus, allocating to the first wireless base station apparatus a wireless resource at least partially overlapping the wireless resource(s) allocated to the third wireless base station.

17. A wireless communication method, comprising:

by a second wireless base station apparatus that covers a second cell that is wider than a first cell covered by the first wireless base station apparatus according to claim 14 and overlaps at least a portion of the first cell, receiving from the first wireless base station apparatus a wireless resource allocation request including a resource amount that is necessary with regard to the first wireless base station apparatus; and by the second wireless base station apparatus, allocating a wireless resource(s) in accordance with the necessary resource amount to the first wireless base station apparatus.

18. A non-transitory computer-readable recording medium storing a program that causes a CPU of a first wireless base station apparatus to execute:

when communication is performed with a mobile station terminal included in a first cell covered by the first wireless base station apparatus, making reference to communication quality of a second cell that is wider than the first cell and overlaps at least a portion of the first cell, and judging based on the communication quality whether or not a wireless resource(s) of a second wireless base station apparatus that covers the second cell is to be reserved; and in a case of judging that reservation of the wireless resource(s) is necessary, transmitting a wireless resource allocation request including a necessary resource amount to the second wireless base station apparatus, wherein in a case of receiving the wireless resource allocation request from the first wireless base station apparatus, when a third cell, covered by a third wireless base station to which a wireless resource(s) is already allocated by the second wireless base station apparatus, and the first cell do not overlap, the second wireless base station apparatus allocates to the first wireless base station apparatus a wireless resource at least partially overlapping the wireless resource(s) allocated to the third wireless base station.

19. A non-transitory computer-readable recording medium storing a program that causes a CPU of a second wireless base station apparatus that covers a second cell that is wider than a first cell and overlaps at least a portion of the first cell to execute:

receiving from the first wireless base station apparatus according to claim 14 that covers the first cell a wireless resource allocation request including a resource amount that is necessary with regard to the first wireless base station apparatus; and allocating a wireless resource(s) in accordance with the necessary resource amount to the first wireless base station apparatus.

* * * * *